United States Patent
Bar-Ziv et al.

(10) Patent No.: US 11,952,548 B2
(45) Date of Patent: Apr. 9, 2024

(54) SYSTEMS, METHODS AND TECHNIQUES FOR TORREFACTION

(71) Applicant: MICHIGAN TECHNOLOGICAL UNIVERSITY, Houghton, MI (US)

(72) Inventors: Ezra Bar-Ziv, Atlantic Mine, MI (US); Stas Zinchik, Hancock, MI (US); Shreyas Sunil Kolapkar, Houghton, MI (US)

(73) Assignee: MICHIGAN TECHNOLOGICAL UNIVERSITY, Houghton, MI (US)

( * ) Notice: Subject to any disclaimer, the term of this patent is extended or adjusted under 35 U.S.C. 154(b) by 3 days.

(21) Appl. No.: 17/693,825

(22) Filed: Mar. 14, 2022

(65) Prior Publication Data

US 2023/0032047 A1   Feb. 2, 2023

Related U.S. Application Data

(60) Provisional application No. 63/225,619, filed on Jul. 26, 2021.

(51) Int. Cl.
   *C10L 9/08* (2006.01)
   *C10L 5/40* (2006.01)
   *C10L 5/36* (2006.01)

(52) U.S. Cl.
   CPC ............ *C10L 9/083* (2013.01); *C10L 5/406* (2013.01); *C10L 5/363* (2013.01);
   (Continued)

(58) Field of Classification Search
   CPC .......... C10L 9/083; C10L 5/406; C10L 5/363; C10L 2200/0461; C10L 2200/0469;
   (Continued)

(56) References Cited

U.S. PATENT DOCUMENTS

| 9,193,916 B2 | 11/2015 | Bar-Ziv et al. |
| 2014/0053458 A1* | 2/2014 | Bar-Ziv .................. C10B 57/02 44/589 |

(Continued)

OTHER PUBLICATIONS

Abbas, D. et al. Life-cycle assessment of forest harvesting and transportation operations in Tennessee, J. Clean. Prod. 176 (2018) 512-520.

(Continued)

*Primary Examiner* — Ellen M McAvoy
(74) *Attorney, Agent, or Firm* — Michael Best & Friedrich LLP

(57) ABSTRACT

A system for torrefaction of waste material comprising biogenic material and plastic material may comprise a material pre-processing system, a heating and compaction unit, a reactor system comprising a reaction portion and an extrusion portion, and a cutting unit adjacent an outlet of the reactor system. A method for operating a system for torrefaction of waste material comprising biogenic and plastic material may comprise processing the waste material to generate waste material having an aspect ratio between 0.8:1 and 1.2:1 and a largest dimension of less than 4 millimeters (mm); compressing and heating the pre-processed waste material in the heating and compaction unit; heating the compacted waste material in the reactor system to a temperature of 280° C.-500° C.; extruding material from the reactor system; and cutting the extruded material into pellets.

5 Claims, 25 Drawing Sheets

(52) U.S. Cl.
CPC ............... C10L 2200/0461 (2013.01); C10L 2200/0469 (2013.01); C10L 2290/28 (2013.01); C10L 2290/30 (2013.01)

(58) Field of Classification Search
CPC .... C10L 2290/28; C10L 2290/30; C10L 5/44; C10L 5/40; C10L 2290/60; C10L 2290/50; C10L 2290/52; C10L 2290/58
See application file for complete search history.

(56) References Cited

U.S. PATENT DOCUMENTS

| | | | | |
|---|---|---|---|---|
| 2014/0109468 | A1* | 4/2014 | Dam-Johansen | C10L 5/363 44/568 |
| 2015/0017313 | A1* | 1/2015 | Zeeck | C10L 5/445 44/589 |
| 2015/0307798 | A1* | 10/2015 | Morihara | C10L 9/083 44/590 |
| 2016/0304800 | A1* | 10/2016 | Rautialinen | C10L 5/445 |
| 2019/0284477 | A1* | 9/2019 | Wilson | C10J 3/82 |
| 2021/0071099 | A1* | 3/2021 | Satyavolu | C10B 49/00 |
| 2021/0115348 | A1* | 4/2021 | Falevsky | C10L 5/445 |
| 2022/0228082 | A1* | 7/2022 | Mennell | C21C 5/527 |
| 2022/0267692 | A1* | 8/2022 | Balon, Jr. | C10L 9/083 |

OTHER PUBLICATIONS

Abdul Samad, N. A. F .; et al. Torrefaction of Municipal Solid Waste in Malaysia. Energy Procedia 2017, 138, 313-318.
Argonne National Laboratory, GREET Life-cycle Model. Center for Transportation Research, Energy System Division, (2019). https://greet.es.anl.gov. 14 pages.
Atienza-Martínez, M.; et al. Sewage Sludge Torrefaction in an Auger Reactor. Energy & Fuels 2015, 29 (1), 160-170.
Berzin, F.; et al. Importance of Coupling between Specific Energy and Viscosity in the Modeling of Twin Screw Extrusion of Starchy Products. Polym. Eng. Sci. 2010, 50 (9), 1758-1766.
Boxman, S. et al. Analysis of MSW Landfill Tipping Fees—2020, Environ. Res. Educ. Found. (2021) 1-9. www.erefdn.org. 9 pages.
Brown T.R., A techno-economic review of thermochemical cellulosic biofuel pathways, Bioresour. Technol. 178 (2015) 166-176.
Brown, J. N. Development of a Lab-Scale Auger Reactor for Biomass Fast Pyrolysis and Process Optimization Using Response Surface Methodology, Iowa State University, 2009. 260 pages.
Brown, J. N.; et al. Process Optimization of an Auger Pyrolyzer with Heat Carrier Using Response Surface Methodology. Bioresour. Technol. 2012, 103 (1), 405-414.
Cafferty, K.G. et al. Model Based Biomass System Design of Feedstock Supply Systems for Bioenergy Production, in: vol. 2B 33rd Comput. Inf. Eng. Conf., American Society of Mechanical Engineers, 2013, pp. 1-9.
Cahyanti, M.N. et al. Biomass torrefaction: An overview on process parameters, economic and environmental aspects and recent advancements, Bioresour. Technol. 301 (2020) 122737.
CalRecyle. California Department of Resources and Recovery. State of Disposal and Recycling in California: For Calendar Year 2016, Aug. 15, 2017. https://www2.calrecycle.ca.gov/Publications/ (32 pages).
Campuzano, F.; et al. Auger Reactors for Pyrolysis of Biomass and Wastes. Renew. Sustain. Energy Rev. 2019, 102 (Dec. 2018), 372-409.
Chen, Q. et al. Influence of torrefaction pretreatment on biomass gasification technology, Chinese Sci. Bull. 56 (2011) 1449-1456.
Chen, W.H. et al. Progress in biomass torrefaction: Principles, applications and challenges, Prog. Energy Combust. Sci. 82 (2021) 100887.
Chen, Z. et al. Pyrolysis of Torrefied Biomass, Trends Biotechnol. 36 (2018) 1287-1298.
Convergen-Energy. Renewable & sustainable fuel https://www.convergenenergy.com/our-fuels/ (accessed May 31, 2022) 3 pages.

Crawford NC, et al. The effects of physical and chemical preprocessing on the flowability of corn stover. Biomass and Bioenergy 2016;85:126-34.
De Souza, H. J. P. L.; et al. Pelletization of Eucalyptus Wood and Coffee Growing Wastes: Strategies for Biomass Valorization and Sustainable Bioenergy Production. Renew. Energy 2020, 149, 128-140.
Dong, J. et al. Key factors influencing the environmental performance of pyrolysis, gasification and incineration Waste-to-Energy technologies, Energy Convers. Manag. 196 (2019) 497-512.
Engineering Toolbox, Wood and Biomass Heat, Eng. Toolbox. (2003). https://www.engineeringtoolbox.com/wood-biomass-combustion-heat-d_440.html (accessed May 31, 2022) 6 pages.
Giles Jr., H. F.; et al. Extrusion: The Definitive Processing Guide and Handbook (ISBN: 0-8155-1473-5), 1st ed.; William Andrew Publishing: Norwitch, NY 13815, 2005. 560 pages.
Godavarti, S.; et al. Determination of Specific Mechanical Energy Distribution on a Twin-Screw Extruder. J. Agric. Eng. Res. 1997, 67 (4), 277-287.
Gracida-Alvarez, U.R. et al. Resource and Greenhouse Gas Assessments of the Thermochemical Conversion of Municipal Solid Waste in Mexico, ACS Sustain. Chem. Eng. 4 (2016) 5972-5978.
Han, J. et al. Well-to-Wheels Analysis of Fast Pyrolysis Pathways with GREET., Oak Ridge, TN, 2011. https://publications.anl.gov/anlpubs/2011/12/71546.pdf (76 pages).
Jiang, S. et al. "Using ATR-FTIR Spectra and Convolutional Neural Networks for Characterizing Mixed Plastic Waste," vol. 1, 2021 107547.
Jin, W. et al. A Review of Computational Models for the Flow of Milled Biomass Part II: Continuum-Mechanics Models, ACS Sustain. Chem. Eng. 8 (2020) 6157-6172.
Kantner, D.; et al. EREF: Analysis of MSW Landfill Tipping Fees Apr. 2019; 2019. https://doi.org/www.erefdn.org. 7 pages.
Katz, C. Piling Up: How China's Ban on Importing Waste Has Stalled Global Recycling. Mar. 7, 2019. https://e360.yale.edu/features/piling-up-how-chinas-ban-on-importing-waste-has-stalled-global-recycling (8 pages).
Kelkar, S.; et al. Pyrolysis of Spent Coffee Grounds Using a Screw-Conveyor Reactor. Fuel Process. Technol. 2015, 137, 170-178.
Klinger, J. et al. Predicting Properties of Torrefied Biomass by Intrinsic Kinetics, Energy & Fuels. 29 (2015) 171-176.
Kolapkar, S. "Integrated Torrefaction-extrusion System for Conversion of Fiber-plastic Wastes into Solid Fuels," Michigan Technological University, Houghton, MI, 2021. 187 pages.
Kolapkar, S. "Pyrolysis of Fiber-plastic Waste Blends," Michigan Technological University, Houghton, MI, 2018. 92 pages.
Kolapkar, S. et al. "Integrated torrefaction-extrusion system for solid fuel pellet production from mixed fiber-plastic wastes: Techno-economic analysis and life cycle assessment," Fuel Process. Technol., vol. 226, p. 107094, 2022.
Kolapkar, S. et al. "Integration of Thermal Treatment and Extrusion by Compounding for Processing Various Wastes for Energy Applications" Energy & Fuels, 35, vol. 15, p. 12227-12236, 2021.
Koppejan, J. et al. Status overview of torrefaction technologies, IEA Bioenergy, 2015. https://www.ieabioenergy.com/blog/publications/status-overview-of-torrefaction-technologies-a-review-of-the-commercialisation-status-of-biomass-torrefaction/. 52 pages.
Kwon, W. T.; et al. Utilization of Waste Plastics as a Fuel in the Fluidized Bed Calciner for Cement Kiln Process. Mater. Sci. Forum 2005, 486, 399-402.
Lafleur PG, et al. Polymer Extrusion. vol. 9781848216. Chichester, UK: John Wiley & Sons, Ltd; 2014, (11 pages).
Laucks, I. F. The Screw as a Carbonizing Machine. Ind. Eng. Chem. 1927, 19 (1), 9-11.
Lepschi, A.; et al. Determining the Residence Time Distribution of Various Screw Elements in a Co-Rotating Twin-Screw Extruder by Means of Fluorescence Spectroscopy. In AIP Conference Proceedings; 2015; vol. 1664, p. 020005.
Li, W. et al. Regional techno-economic and life-cycle analysis of the pyrolysis-bioenergy-biochar platform for carbon- negative energy, Biofuels, Bioprod. Biorefining. 13 (2019) 1428-1438.

(56) References Cited

OTHER PUBLICATIONS

Lu, Y. et al. Flow characterization of compressible biomass particles using multiscale experiments and a hypoplastic model, Powder Technol. 383 (2021) 396-409.
Luo, S.; et al. Interfacial Improvements in a Green Biopolymer Alloy of Poly(3-Hydroxybutyrate-Co-3-Hydroxyvalerate) and Lignin via in Situ Reactive Extrusion. ACS Sustain. Chem. Eng. 2016, 4 (6), 3465-3476.
Martinez J.D.; et al. Demonstration of the Waste Tire Pyrolysis Process on Pilot Scale in a Continuous Auger Reactor. J. Hazard. Mater. 2013, 261, 637-645.
Martinez, I.; et al. Optimised Production of Tailored Syngas from Municipal Solid Waste (MSW) by Sorption-Enhanced Gasification. Chem. Eng. J. 2020, 401 (May), 126067.
Mody, J. et al. Production and Characterization of Biocoal for Coal-Fired Boilers, in: vol. 1 Fuels Combust. Mater. Handl. Emiss. Steam Gener. Heat Exch. Cool. Syst. Turbines, Gener. Aux. Plant Oper. Maintenance; Reliab. Availab. Maintainab. (RAM); Plant Syst., American Society of Mechanical Engineers, 2014 (6 pages).
Nachenius, R.W. et al. Torrefaction of pine in a bench-scale screw conveyor reactor, Biomass and Bioenergy. 79 (2015) 96-104.
Nikitine, C.; et al. Residence Time Distribution of a Pharmaceutical Grade Polymer Melt in a Single Screw Extrusion Process. Chem. Eng. Res. Des. 2009, 87 (6), 809-816.
Niu, Y. et al. Biomass torrefaction: properties, applications, challenges, and economy, Renew. Sustain. Energy Rev. 115 (2019) 109395.
Nunes LJR, A Case Study about Biomass Torrefaction on an Industrial Scale: Solutions to Problems Related to Self-Heating, Difficulties in Pelletizing, and Excessive Wear of Production Equipment, Appl. Sci. 10 (2020) 2546.
Pellet America Corp. Renewable energy—recycled fuel pellets http://www.pelletamerica.com/ (accessed Jun. 1, 2022) 4 pages.
Prins, M.J. et al. More efficient biomass gasification via torrefaction, Energy. 31 (2006) 3458-3470.
Qi, F. et al. Particle scale modeling of heat transfer in granular flows in a double screw reactor, Powder Technol. 335 (2018) 18-34.
Qi, F.; et al. A Dem Modeling of Biomass Fast Pyrolysis in a Double Auger Reactor. Int. J. Heat Mass Transf. 2020, 150 (2), 119308.
Radics, R.I. et al. Systematic review of torrefied wood economics, BioResources. 12 (2017) 6868-6884.
Recari, J.; et al. Torrefaction of a Solid Recovered Fuel (SRF) to Improve the Fuel Properties for Gasification Processes. Appl. Energy 2017, 203, 177-188.
Sasimowski, E.; et al. Efficiency of Twin-Screw Extrusion of Biodegradable Poly (Butylene Succinate)-Wheat Bran Blend. Materials (Basel). 2021, 14 (2), 424.
Schmid, V.; et al. Extrusion Processing of Pure Chokeberry (*Aronia melanocarpa*) Pomace: Impact on Dietary Fiber Profile and Bioactive Compounds. Foods 2021, 10 (3), 518.
Setkit, N.; et al. Torrefaction Behavior of Hot-Pressed Pellets Prepared from Leucaena Wood. Bioresour. Technol. 2021, 321 (Dec. 2020), 124502.
Shi, X.; et al. 3D Eulerian-Eulerian Modeling of a Screw Reactor for Biomass Thermochemical Conversion. Part 2: Slow Pyrolysis for Char Production. Renew. Energy 2019, 143, 1477-1487.
Silveira, E.A. et al. An assessment of biomass torrefaction severity indexes, Fuel. 288 (2021) 1-13.
Srinivasan, V. et al. Catalytic pyrolysis of torrefied biomass for hydrocarbons production, Energy and Fuels. 26 (2012) 7347-7353.
Stark, C.; et al. Evaluating Pellet Quality. Kansas State Univ. Agric. Exp. Stn. Coop. Ext. Serv. 2015, ME3228, 0-3.
Thompson, J. US landfill capacity to drop 15% over next 5 years https://wihresourcegroup.wordpress.com/2018/06/20/US-landfill-capacity-to-drop-15-over-next-5-years/ (accessed Sep. 3, 2021) 5 pages.
Truelove, A.; et al. The State of Recycling National Survey—U.S. PIRG Education Fund Nov. 14, 2019. https://uspirg.org/sites/pirg/files/reports/Trash-In-America/The-State-of-Recycling-National-Survey_111319.pdf, 18 pages).
U.S. Department of Energy: EERE. Alternative Aviation Fuels: Overview of Challenges, Opportunities, and Next Steps; 2021; vol. DOE/EE-151. 88 pages.
U.S. Department of Energy: EERE. Waste-to-Energy from Municipal Solids Wastes https://www.energy.gov/sites/prod/files/2019/08/f66/BETO--Waste-to-Energy-Report-August-2019.pdf (36 pages).
U.S. Environmental Protection Agency. Advancing Sustainable Materials Management: 2018 Fact Sheet.Washington DC: 2020. 25 pages.
U.S. Environmental Protection Agency. eGRID 2019 Summary Data, (2021). https://www.epa.gov/egrid/summary-data (accessed Jun. 1, 2021) (5 pages).
Vinti, G. et al. Municipal Solid Waste Management and Adverse Health Outcomes: A Systematic Review, Int. J. Environ. Res. Public Health. 18 (2021) 4331.
Waje, S. S.; et al. An Experimental Study of the Thermal Performance of a Screw Conveyor Dryer. Dry. Technol. 2006, 24 (3), 293-301.
Weidema, B.P. et al. Data quality guideline for the ecoinvent database version 3. Ecoinvent Report 1 (v3), Swiss Cent. Life Cycle Invent. 3 (2013) 169 pages.
Whalley, S. et al. Economic analysis of woody biomass supply chain in Maine, Biomass and Bioenergy. 96 (2017) 38-49.
Wilen, C. et al. Wood torrefaction—pilot tests and utilisation, VTT Technology 122, 2013. 80 pages.
Wright, et al. Techno-economic analysis of biomass fast pyrolysis to transportation fuels, Fuel. 89 (2010) S2-S10.
Xia, Y. et al. A Review of Computational Models for the Flow of Milled Biomass Part I: Discrete-Particle Models, ACS Sustain. Chem. Eng. 8 (2020) 6142-6156.
Xu Z, et al. Bypassing Energy Barriers in Fiber-Polymer Torrefaction. Front Energy Res 2021; vol. 9:1-13.
Xu Z., "Torrefaction of Mixed Solid Waste," Michigan Technological University, Houghton, MI, 2019. 171 pages.
Xu, Z. et al. "Chlorine Removal from U.S. Solid Waste Blends through Torrefaction," Appl. Sci., vol. 10, No. 9, p. 3337, May 2020.
Xu, Z. et al. "Comprehensive kinetic study of thermal degradation of polyvinylchloride (PVC)," Polym. Degrad. Stab., vol. 176, p. 109148, Jun. 2020.
Xu, Z. et al. "Kinetic Study of Paper Waste Thermal Degradation," Polym. Degrad. Stab., vol. 191, No. C, p. 109681, 2021.
Xu, Z. et al. "Properties of Torrefied U.S. Waste Blends," Front. Energy Res., vol. 6, p. 65, Jul. 2018.
Zinchik S. "Paddle Mixer-extrusion Reactor for Torrefaction and Pyrolysis," Michigan Technological University, Houghton, MI, 2019 (176 pages).
Zinchik, S. et al. "Accurate Characterization of Mixed Plastic Waste Using Machine Learning and Fast Infrared Spectroscopy," ACS Sustain. Chem. Eng., vol. 9, No. 42, pp. 14143-14151, 2021.
Zinchik, S. et al. "Evaluation of Fast Pyrolysis Feedstock Conversion with a Mixing Paddle Reactor," Fuel Process. Technol., vol. 171, p. 124-132, 2018.
Zinchik, S. et al. "Properties of pellets of torrefied U.S. waste blends," Waste Manag., vol. 104, pp. 130-138, Mar. 2020.

* cited by examiner

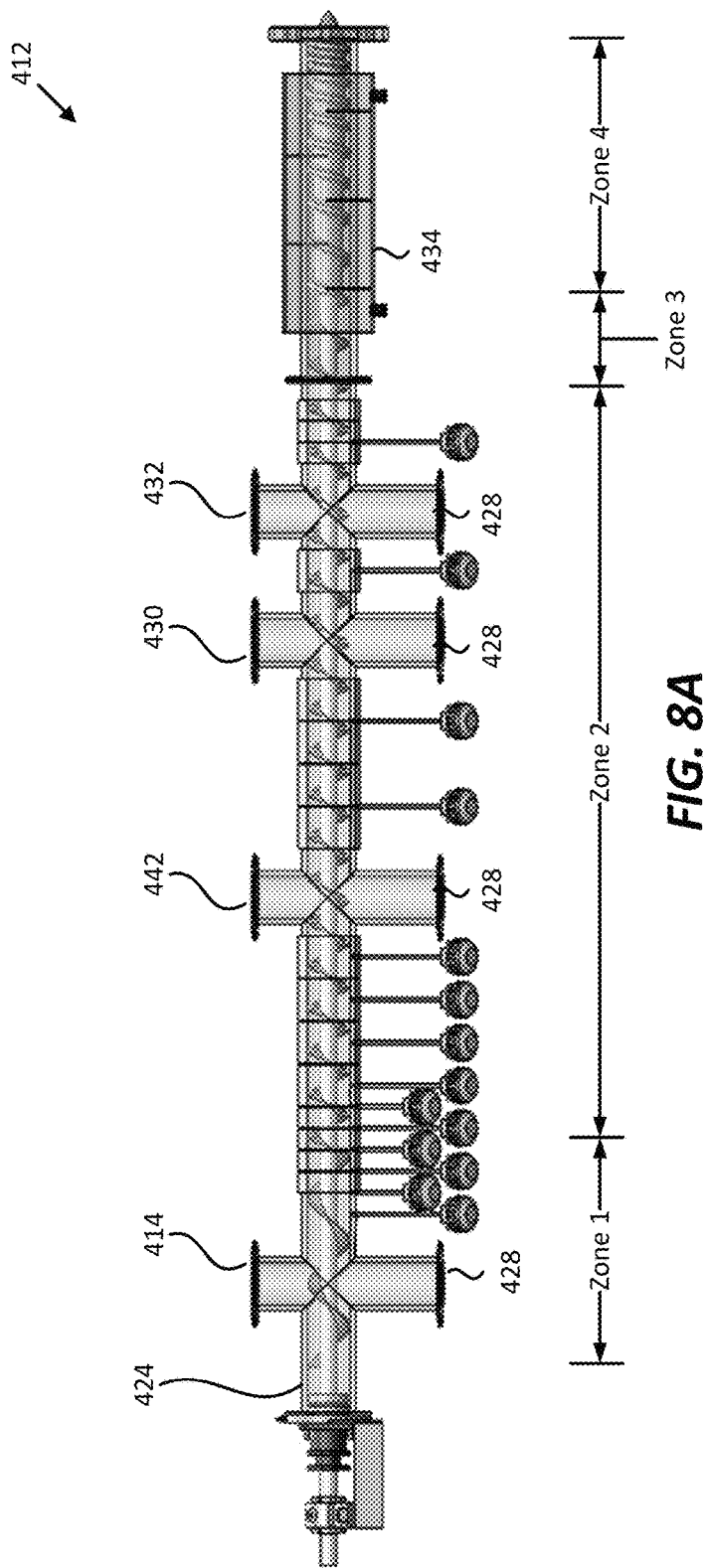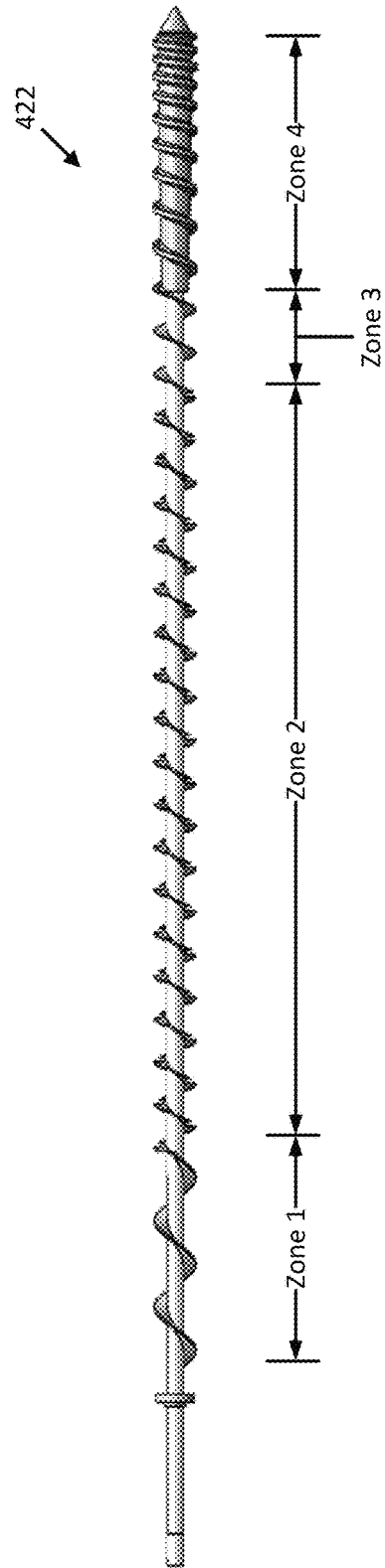
*FIG. 8A*
*FIG. 8B*

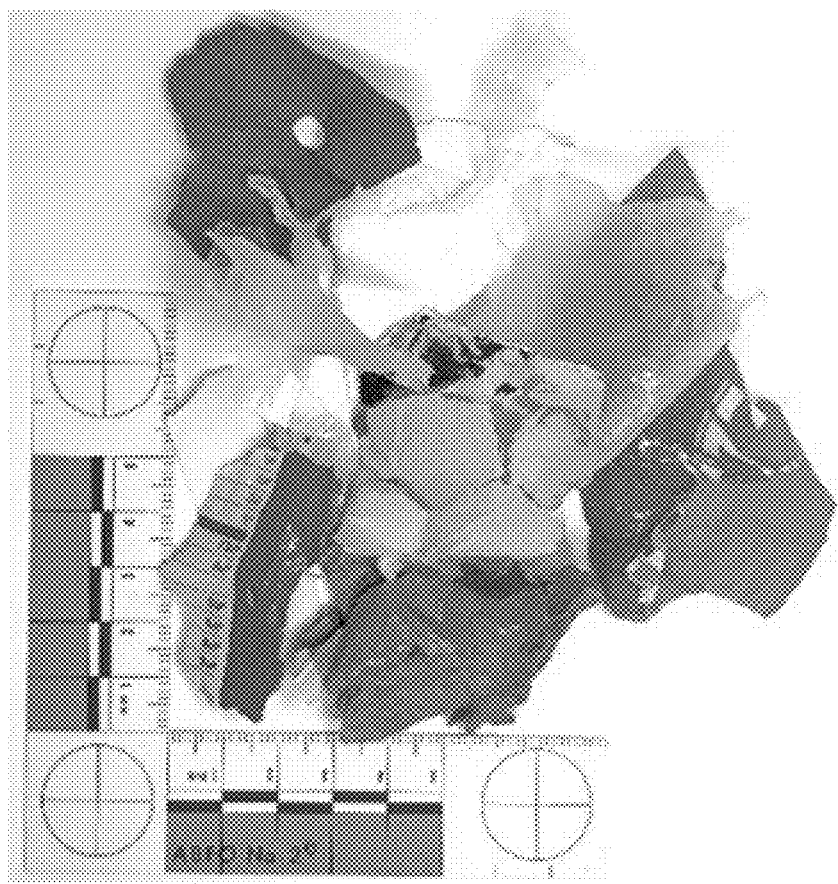
*FIG. 16A*
*FIG. 16B*
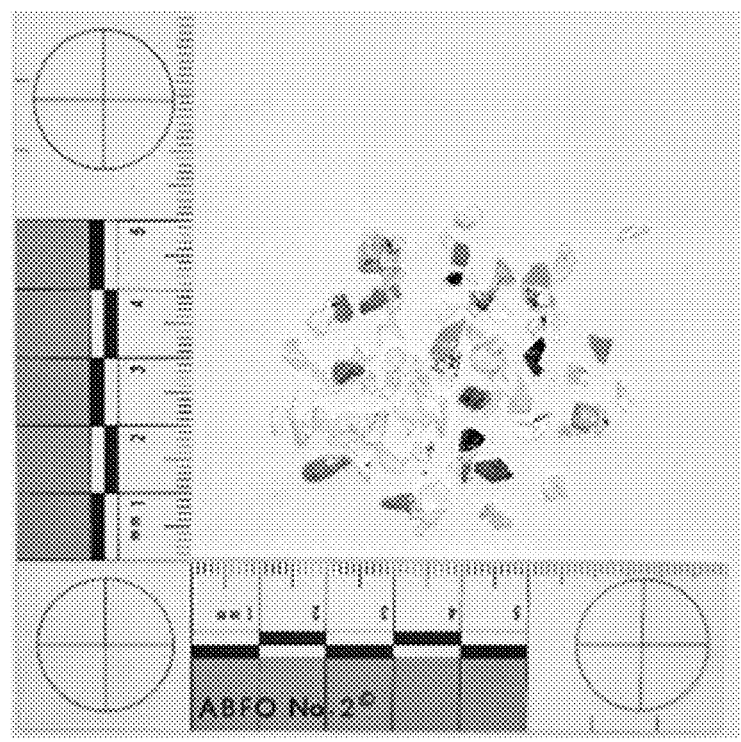

SYSTEMS, METHODS AND TECHNIQUES FOR TORREFACTION

CROSS-REFERENCE TO RELATED APPLICATION(S)

The present application is related to and claims the priority benefit of U.S. Provisional Patent Application No. 63/225,619, filed on Jul. 26, 2021, the entire contents of which are incorporated herein by reference.

STATEMENT OF GOVERNMENT INTEREST

This invention was made with government support under grant number 1827364 awarded by the National Science Foundation. The government has certain rights in the invention.

FIELD

The present disclosure is related to systems and methods for torrefaction. Exemplary systems and methods may be particularly suited for torrefaction of waste material comprising both biogenic and plastic material.

INTRODUCTION

As the world population continues to increase, so does waste generation. It is anticipated that, by 2050, humans will generate wastes at a record high of 3.4 billion tons worldwide. As a result, we are witnessing an unprecedented accumulation of fiber/plastic wastes in landfills, on land and in oceans with well-documented negative consequences. Countries such as Germany have adapted the Waste-to-Energy approach as a preferred path to address the waste disposal issue. The downside is that Waste-to-Energy is economically prohibitive due to high operational and gas cleanup costs to meet emission standards. In parallel, some U.S. states, such as Florida and California, have mandated high recycling rates, but with recent world events like the Chinese ban on recyclable imports, critical issues with recycling have surfaced. Apart from this, recycling cost is also often driven up to economically prohibitive levels due to barriers like (a) Batch to batch inconsistencies of wastes, (b) Heterogeneity in the waste stream, (c) Bridging and conveying issues due to the low feedstock density (~50 kg/m$^3$), (d) inefficient separation technologies for polymers to produce high purity polymers that can be recycled, and (e) difficulties in flowing wastes plastics into reactors.

One pathway to address these challenges is the thermochemical pathway of torrefaction. Torrefaction is a process of heating the feedstock at temperatures usually ranging from 280 to 500° C. either in the absence of oxygen or in an oxygen-starved environment. Torrefaction converts the waste feedstock mainly into a solid fraction. This solid product can be utilized as a solid fuel in cofiring boilers and cement kilns or can be upgraded to transportation fuels, sustainable aviation fuels, and chemicals through catalytic pyrolysis or gasification.

SUMMARY

In one aspect, a system for torrefaction of waste material comprising biogenic material and plastic material is disclosed. The system may comprise a material pre-processing system comprising a first stage shredder, a second stage shredder, and a third stage shredder; a heating and compaction unit comprising an auger and a heating portion configured to compact and heat the third reduced size material; a reactor system configured to receive compacted third reduced size material from the heating and compaction unit, the reactor system comprising a reaction portion and an extrusion portion; and a cutting unit positioned adjacent an outlet of the reactor system. The first stage shredder may be configured to generate first reduced size material by reducing the waste material to a first size no greater than 300 millimeters (mm); the second stage shredder may be configured to generate second reduced size material by reducing the first reduced size material to a second size no greater than 50 mm; and the third stage shredder configured to generate third reduced size material by reducing the second reduced size material to having a largest dimension less than 4 mm and an aspect ratio between 0.8:1 and 1.2:1.

In another aspect, a heating and compaction assembly is disclosed. The exemplary heating and compaction assembly may comprise a housing defining an inlet, an outlet, and a plurality of transport zones positioned in series between the inlet and the outlet; an auger rotationally received by the housing, the auger defining a helical fighting, the helical fighting including a plurality of fighting portions, each fighting portion having a different pitch, each pitch being associated with one of the plurality of transport zones; and a heating assembly configured to heat material transported in at least one of the transport zones.

In another aspect, a method for operating a system for torrefaction of waste material comprising biogenic and plastic material is disclosed. The exemplary method may comprise processing waste material comprising biogenic material and plastic material to generate a coarse size waste material; processing the coarse size waste material to generate a fine size waste material; processing the fine size waste material to generate pre-processed waste material, the pre-processed waste material having an aspect ratio between 0.8:1 and 1.2:1 and a largest dimension of less than 4 millimeters (mm); providing the pre-processed waste material to a heating and compaction unit; compressing and heating the pre-processed waste material in the heating and compaction unit; providing the compacted waste material to a reactor system such that a residence time in the reactor system is between 2 minutes and 30 minutes; heating the compacted waste material in the reactor system to a temperature of 280° C.-500° C.; extruding material from the reactor system; and cutting the extruded material into pellets.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 8A shows a right side view of the reactor and extruder system shown in FIG. 7 with a portion of the reactor housing removed to show various internal components. FIG. 8B shows an exemplary shaft 422 that may be positioned within the reactor and extruder system shown in FIG. 7.

FIG. 16A shows the presorted mixed fiber-plastic feedstock used in an experimental study. FIG. 16B shows the feedstock after the final shredding stage.

DETAILED DESCRIPTION

Figure 1:
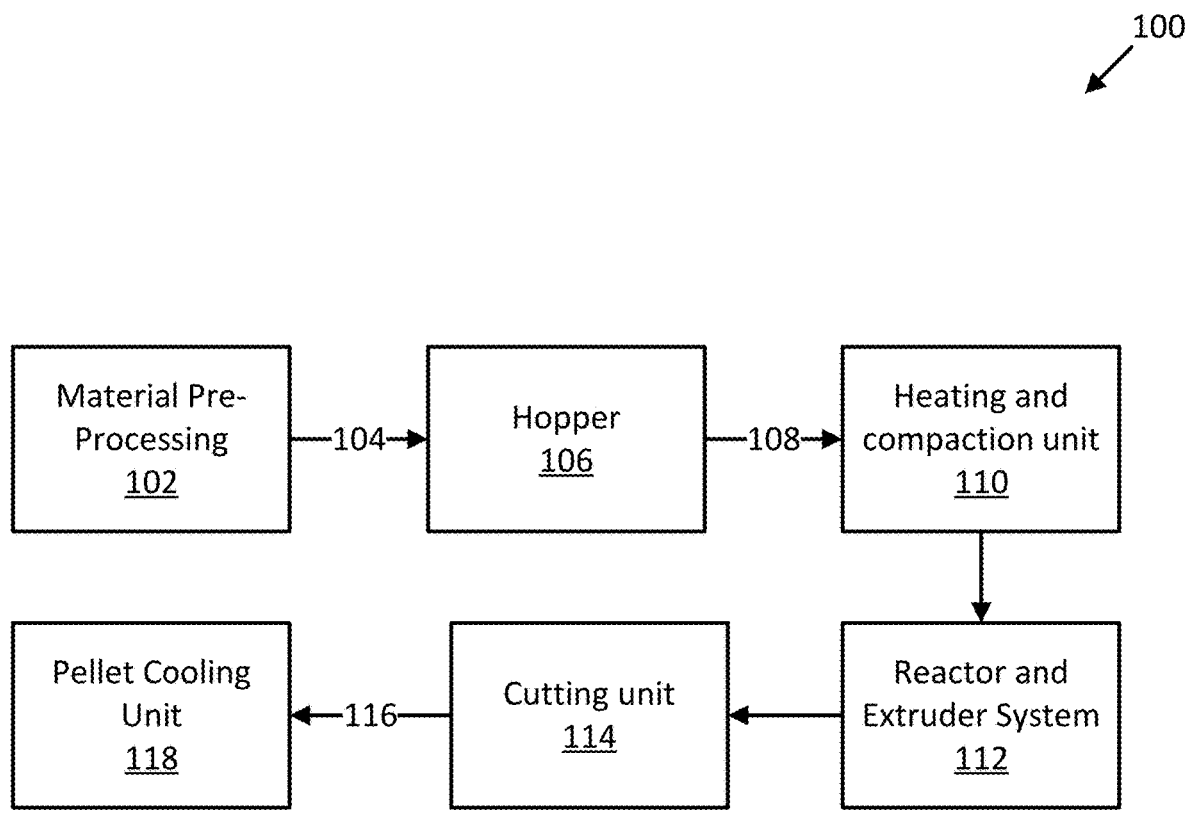
FIG. 1 is a schematic diagram of an exemplary system for generating torrefied products from waste material comprising biogenic material and plastic material.

Generally, mixed fiber-plastic wastes and municipal solid waste (MSW) may have flowability problems, such as bridging in hoppers, because of heterogeneity, different sizes, density, moisture content, and/or compressibility. One solution to these issues is to limit the type of material used or to use pneumatic or mechanical agitation techniques. However, neither provides an efficient solution. The instant disclosure is directed to systems, methods, and techniques relating to torrefaction of waste materials.

I. Definitions

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are explicitly contemplated.

II. Exemplary Materials

Exemplary systems and methods process waste material and generate torrefied material. Various materials may be used as feedstock materials and typically, exemplary feedstock materials are waste materials.

Broadly, feedstock material comprises biogenic materials and plastic materials and are provided to the pre-processing systems described in greater detail below. In some instances, feedstock material may comprise other types of materials, such as metals, stones, and glass, and those non-biogenic and non-plastic materials may be removed prior to material pre-processing.

Biogenic materials used as feedstock comprise organic material. Exemplary types of biogenic materials may include paper products, cardboard products, carton products, food, and plants.

Various types of plastic materials may be used as feedstock. For instance, plastic materials may comprise Low-density Polyethylene (LDPE), High-density Polyethylene (HDPE), Polypropylene (PP), Polyethylene Terephthalate (PET), Polyamides (Nylon), polyvinyl materials (including polyvinyl chloride), acrylates, cellophane, and combinations thereof.

Exemplary feedstock materials may comprise various ratios of biogenic materials to plastic materials. In various implementations, feedstock materials may comprise, by weight, no less than 40%; no less than 45%; no less than 50%; no less than 55%; no less than 60%; or no less than 65% biogenic materials, the balance being plastic materials. In various implementations, feedstock materials may comprise, by weight, no less than 70%; no less than 65%, no less than 60%; no less than 55%; no less than 50%; no less than 45%; or no less than 40% biogenic materials, the balance being plastic materials. In various implementations, feedstock materials may comprise, by weight, 40-70% biogenic materials; 45-65% biogenic materials; 50-60% biogenic materials; 55-65% biogenic materials; 57-63% biogenic materials; or 58-62% biogenic materials.

Exemplary torrefied material generated by systems and methods disclosed herein may be water resistant.

Exemplary torrefied material generated by systems and methods disclosed herein may have less than 5 wt %; less than 3 wt %; less than 2 wt %; less than 1 wt %; less than 0.1 wt %; or less than 0.01 wt % chlorine (Cl) material.

Exemplary torrefied material generated by systems and methods disclosed herein may have more than 99% durability.

Exemplary torrefied material generated by systems and methods disclosed herein may have grindability to produce at least 70% particle smaller than 200 mesh.

III. Example Systems

Exemplary systems disclosed and contemplated herein may comprise various components. FIG. 1 is a schematic diagram of exemplary system 100 for generating torrefied products from waste material comprising biogenic material and plastic material. As shown, system 100 comprises material pre-processing 102, hopper 106, heating and compaction unit 110, reactor and extruder system 112, cutting unit 114, and pellet cooling unit 118. One or more conveying units 104, 108, and 116 may be used to convey material between components. Other embodiments may include more or fewer components.

Material pre-processing 102 receives waste material and reduces the size of the waste material for use in heating and compaction unit 110 and reactor and extruder system 112. An initial size of waste material is not particularly limited. In some instances, waste material may be received as rolls and/or bales.

Material pre-processing 102 comprises a plurality of shredding systems. Each successive shredding system stage reduces a size of the waste material. Material pre-processing 102 may also comprise material transport components, such as belts and/or loaders. Exemplary material transport components may transport waste material to and/or between shredding system stages.

Reducing the size of waste material in a series of shredding systems, particularly to sizes contemplated herein, allows the waste material to be downsized without 'fluffing up'—a volumetric expansion effect caused by the presence of fibers. In some instances, the low-shear downsizing approach may: (i) enable up to three times density increase, thus reducing downstream components' size; (ii) prevent the formation of very-low-density fluffy material caused by high-shear shredding; (iii) produce a more uniform blend than the incoming material, and/or (iv) reduce the material bridging tendency. Further reduction in particle size can be achieved using recirculation of material.

In some instances, each of the plurality of shredding systems may be co-located at a given site. In some instances, one, or more than one, of the shredding systems may be located at a first site, and the output from that shredding system may be transported for processing at a different location. In some instances, material pre-processing 102 may comprise three shredding system stages, although it will be appreciated that more or fewer shredding systems may be used in alternative implementations. In some implementations, each stage may comprise multiple shredding units operating in parallel.

A first stage shredder may be configured to generate first reduced size material by reducing the size of the waste material. As used herein, "size" refers to an average size of the waste material along its longest dimension.

In some instances, the first reduced size material may have a size no greater than 310 millimeters (mm); no greater than 305 mm; no greater than 300 millimeters (mm); no greater than 295 mm; no greater than 290 mm; no greater than 285 mm; no greater than 280 mm; or no greater than 275 mm.

Exemplary first reduced size material may have various densities. In some instances, exemplary first reduced size material may have a density between 40 to 70 kg/m$^3$. In some instances, exemplary first reduced size material may have a density of no less than 40 kg/m$^3$; no less than 45 kg/m$^3$; no less than 50 kg/m$^3$; no less than 55 kg/m$^3$; no less than 60 kg/m$^3$; or no less than 65 kg/m$^3$. In some instances, exemplary first reduced size material may have a density of no greater than 70 kg/m$^3$; no greater than 65 kg/m$^3$; no greater than 60 kg/m$^3$; no greater than 55 kg/m$^3$; no greater than 50 kg/m$^3$; or no greater than 45 kg/m$^3$.

Exemplary first reduced size material may have various moisture contents. In some instances, exemplary first reduced size material may have a moisture content between 1.4-5.5%.

A second stage shredder may be configured to generate second reduced size material by reducing the material generated by the first stage shredder. In some instances, the second stage shredder may comprise industrial shredding components.

In some instances, the second reduced size material may have a size no greater than 60 mm; no greater than 55 mm; no greater than 53 mm; no greater than 50 mm or no greater than 48 mm.

A third stage shredder may be configured to generate third reduced size material by reducing the material generated by the second stage shredder. In some instances, the third stage shredder may comprise cross-cut shredding components.

Third stage shredding may be conducted at relatively lower speeds because higher speed shredding (>1000 rpm) can cause fluffing up of material. Exemplary shredding speeds for the third stage may be between 100 rpm and 500 rpm; between 100 rpm and 250 rpm; between 250 rpm and 500 rpm; between 200 rpm and 400 rpm; or between 200 rpm and 300 rpm. In some instances, shredding speeds for the third stage may be no less than 100 rpm; no less than 150 rpm; no less than 200 rpm; no less than 250 rpm; no less than 300 rpm; no less than 350 rpm; no less than 400 rpm; or no less than 450 rpm. In some instances, shredding speeds for the third stage may no greater than 500 rpm; no greater than 450 rpm; no greater than 400 rpm; no greater than 350 rpm; no greater than 300 rpm; no greater than 250 rpm; or no greater than 200 rpm.

In some instances, the third reduced size material may have a size less than 5 mm; less than 4.5 mm; less than 4 mm; or less than 3 mm. In some instances, the third reduced size material may have a size between 2 mm and 5 mm; between 3 mm and 5 mm; between 2 mm and 4 mm; between 2 mm and 3 mm; between 3 mm and 4 mm; or between 4 mm and 5 mm.

In some instances, the third reduced size material may have an aspect ratio between 0.8:1 and 1.2:1; between 0.9:1 and 1.1:1; between 0.95:1 and 1.05:1; between 0.98:1 and 1.02:1; or 1:1.

Exemplary third reduced size material may have various densities. In some instances, exemplary third reduced size material may have a density between 105 to 120 kg/m$^3$; between 105 and 112 kg/m$^3$; between 112 and 120 kg/m$^3$; between 110 and 120 kg/m$^3$; or between 115 and 120 kg/m$^3$. In some instances, exemplary third reduced size material may have a density no less than 105 kg/m$^3$; no less than 110 kg/m$^3$; no less than 115 kg/m$^3$; or no less than 118 kg/m$^3$. In some instances, exemplary third reduced size material may have a density no greater than 120 kg/m$^3$; no greater than 115 kg/m$^3$; no greater than 110 kg/m$^3$; or no greater than 107 kg/m$^3$.

Third reduced size material may be transported from material pre-processing 102 to hopper 106 by various conveying unit 104. In some instances, conveying unit 104 comprises one or more bucket elevators. Exemplary bucket elevators may be variously sized and may be U-series bucket elevators.

Hopper 106 receives shredded waste material and meters the flow of material provided to heating and compaction unit 110. The hopper 106 design may minimize or eliminate bridging of the waste material during flow.

Figure 2:
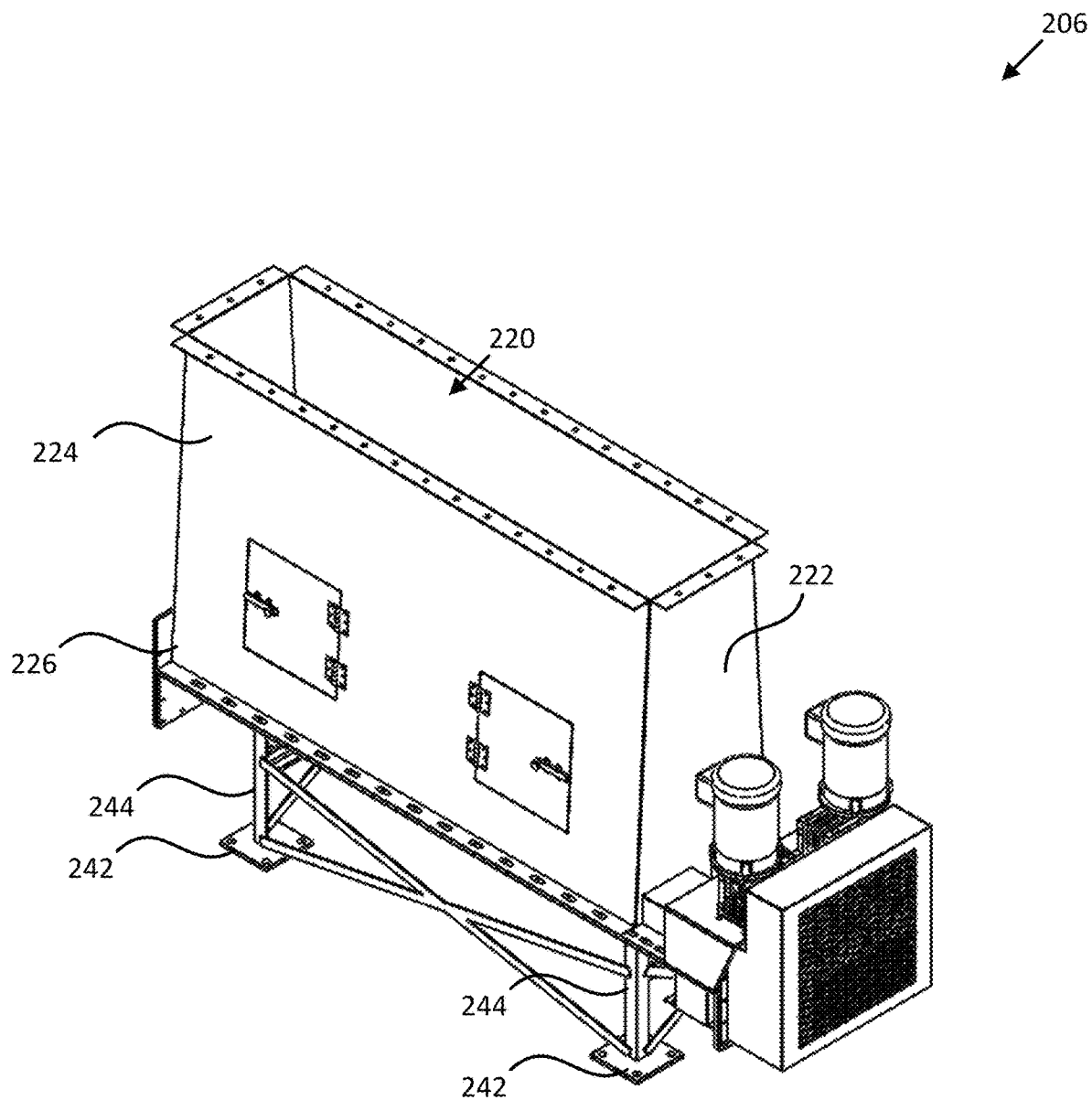
FIG. 2 is a front left isometric view of an exemplary hopper.
Figure 3A:
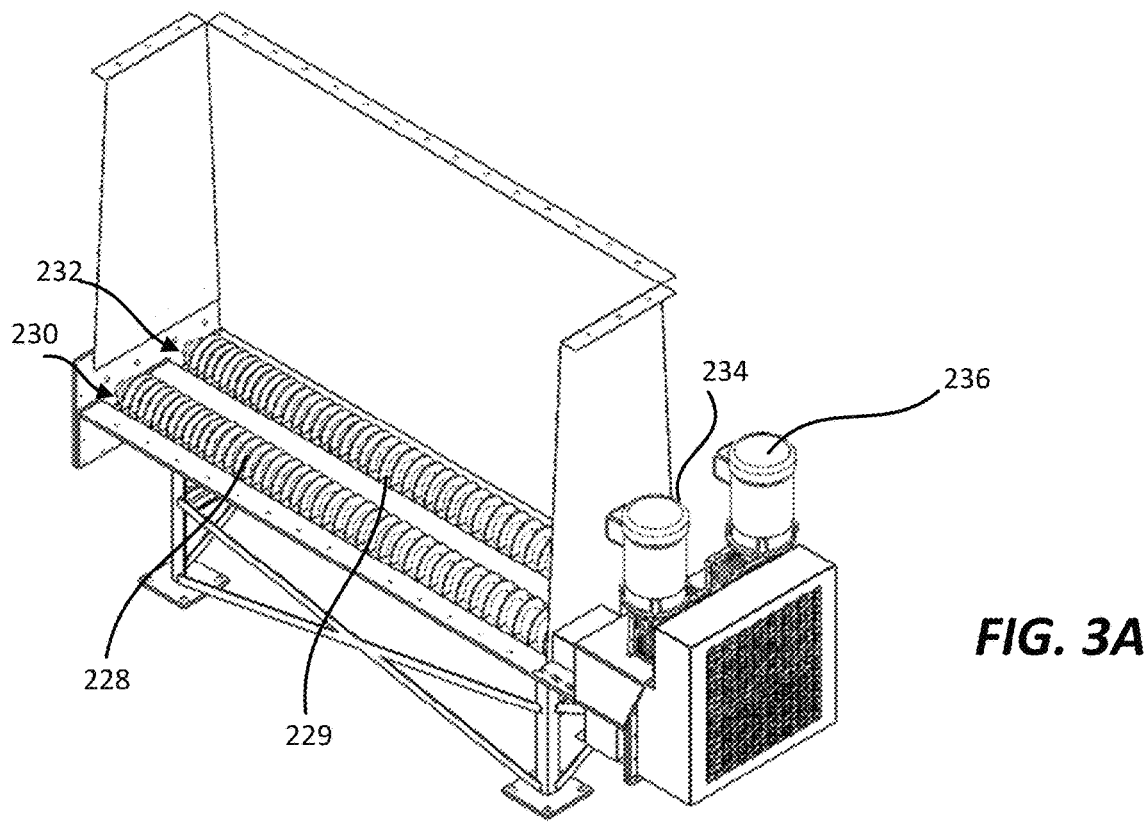
FIG. 3A and FIG. 3B show isometric views of the hopper shown in FIG. 2 with a sidewall removed for clarity.
Figure 3B:
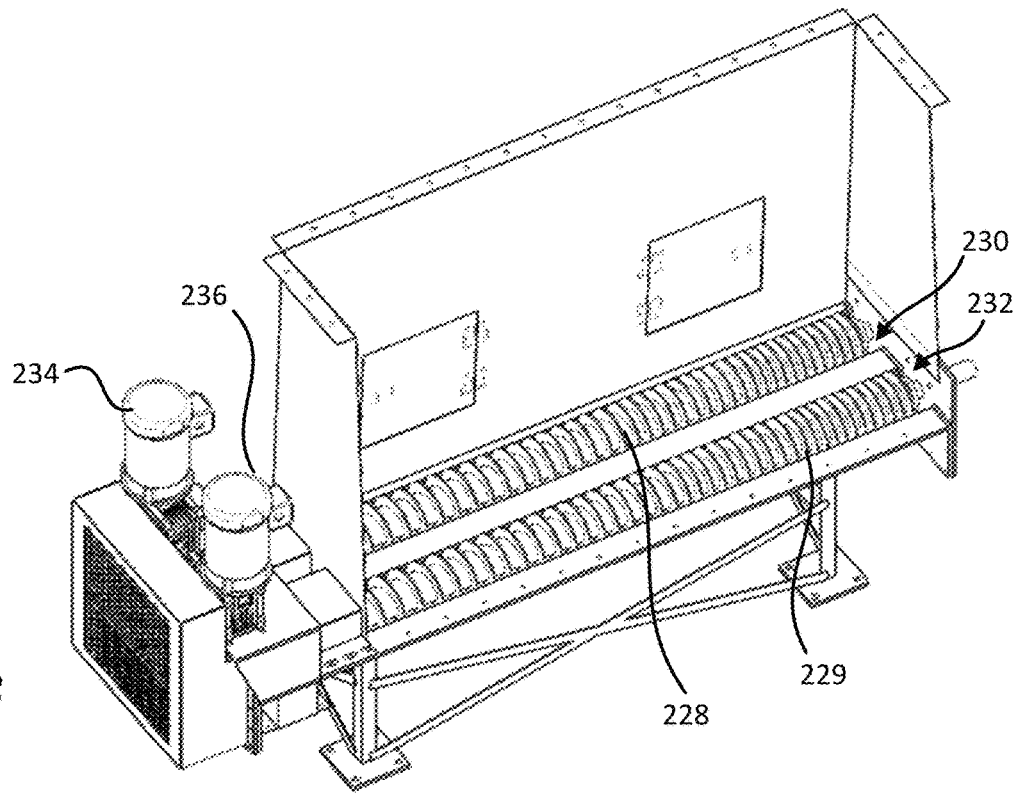
Figure 4:
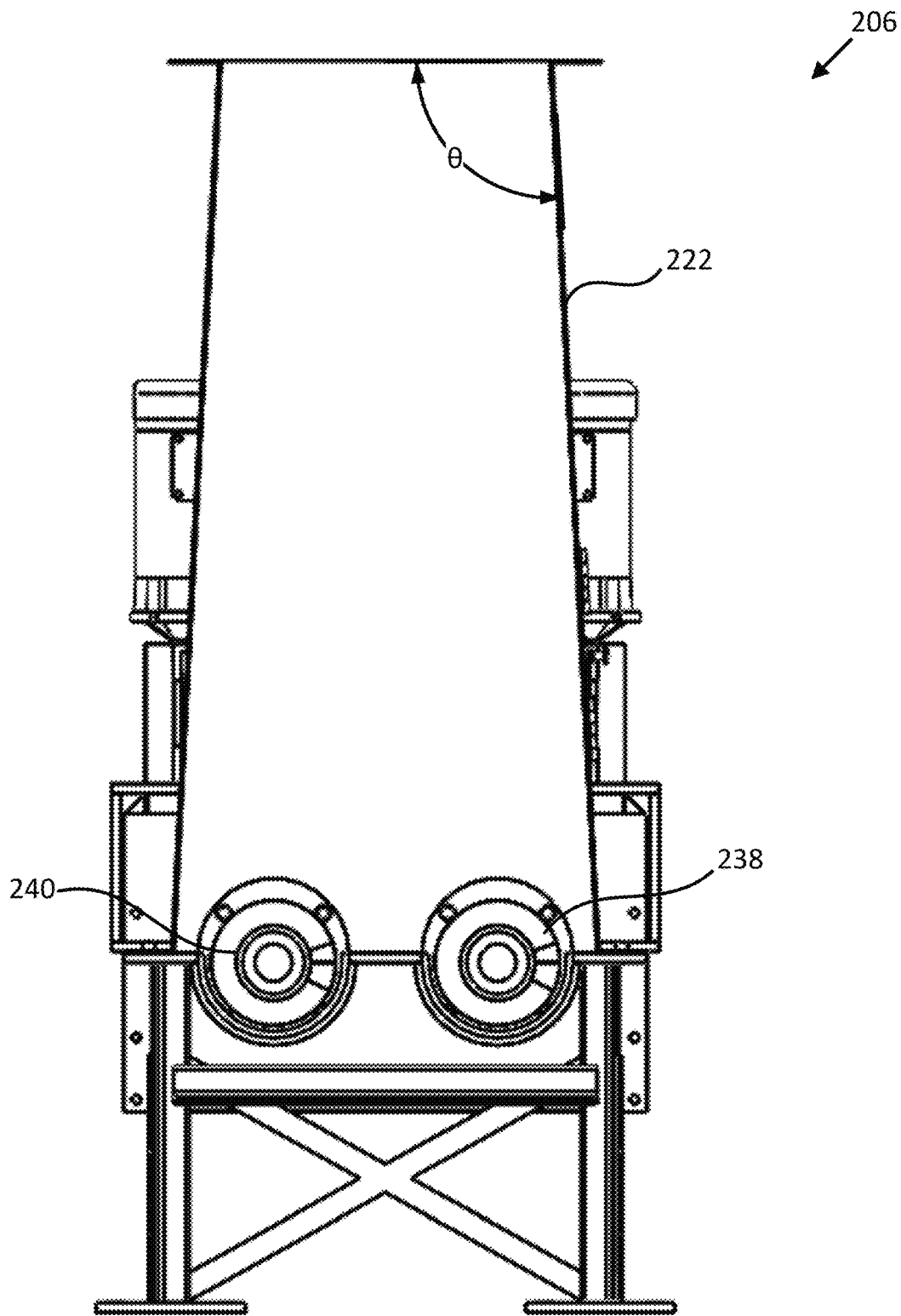
FIG. 4 shows a rear plan view of the hopper shown in FIG. 2.

An embodiment of an exemplary hopper 206 is shown in FIG. 2, FIG. 3A, FIG. 3B, and FIG. 4, discussed concurrently below. FIG. 2 is a front left isometric view of an exemplary hopper 206. FIG. 3A and FIG. 3B show isometric views of exemplary hopper 206 with sidewall 224 removed for clarity. FIG. 4 shows a rear plan view of exemplary hopper 206.

Hopper 206 receives waste material through an upper opening 220 at a top portion of the unit, where the upper opening 220 is defined by the pairs of side walls 222 and 224. Waste material provided through upper opening 220 falls to a bottom portion of an internal cavity of hopper 106.

The cross-sectional area of the cavity increases from top to bottom 226 of the cavity, which may limit or eliminate bridging of material during flow. Described another way, an angle θ formed by side wall 222 and a horizontal (i.e., parallel to level ground), may be between 92° and 101°. In various implementations, angle θ may be between 93° and 100°; between 93° and 97°; between 97° and 100°; between 93° and 95°; or between 93° and 94°. In various implementations, angle θ may be no less than 92°; no less than 93°; no less than 95°; no less than 97°; or no less than 99°. In various implementations, angle θ may be no more than 101°; no more than 99°; no more than 97°; no more than 95°; or no more than 93°.

As shown, hopper 206 includes variable pitch auger 228 positioned within a trough 230 and variable pitch auger 229 positioned within a trough 232. Having variable pitches may enable maintaining a uniform material level in the hopper 206. Variable pitch auger 228 may be independently controlled from variable pitch auger 229. Variable pitch auger 228 is rotated by power source 234, and variable pitch auger 229 is rotated by power source 236.

As shown, a central axis of variable pitch auger 228 is parallel to a central axis of variable pitch auger 229. Waste material exits trough 230 via outlet 238, and waste material exits trough 232 via outlet 240.

In other implementations, particularly those comprising a plurality of heating and compaction units 110, more than one hopper 106 may be used. In other implementations, more than two augers may be used, where each auger is arranged such that the central axes are parallel to each other.

Hopper 206 may also include one or more load cells 242 positioned under legs 244. Load cells 242 may provide a weight measurement of the material in the hopper 206. In turn, the current weight measurement may be used to adjust a flow of material into hopper 206 and/or rotational speeds of variable pitch augers 228 and 229. In some instances, each leg 244 may comprise vibration insulating pads, which may insulate motor vibration from measurements obtained by load cell(s) 242.

Referring again to FIG. 1, hopper 106 may provide shredded waste material to heating and compaction unit 110 via various conveying unit 108. As an example, conveying unit 108 may comprise a bucket elevator.

Heating and compaction unit 110 agitates, compacts and raises a temperature of the shredded waste material before the material is provided to the reactor and extruder system 112. Heating and compaction unit 110 receives shredded waste material from hopper 106 via conveying unit 108. Some implementations may include multiple heating and compaction units 110, and each unit 110 may be configured to operate in parallel.

Heating and compaction unit 110 may enable continuous and stable feeding of waste material to the reactor and extruder system 112. Typically, heating and compaction unit 110 is vertically oriented, such that shredded waste material is provided to an upper portion of the unit 110 and material flows downward through the unit.

Figure 5:
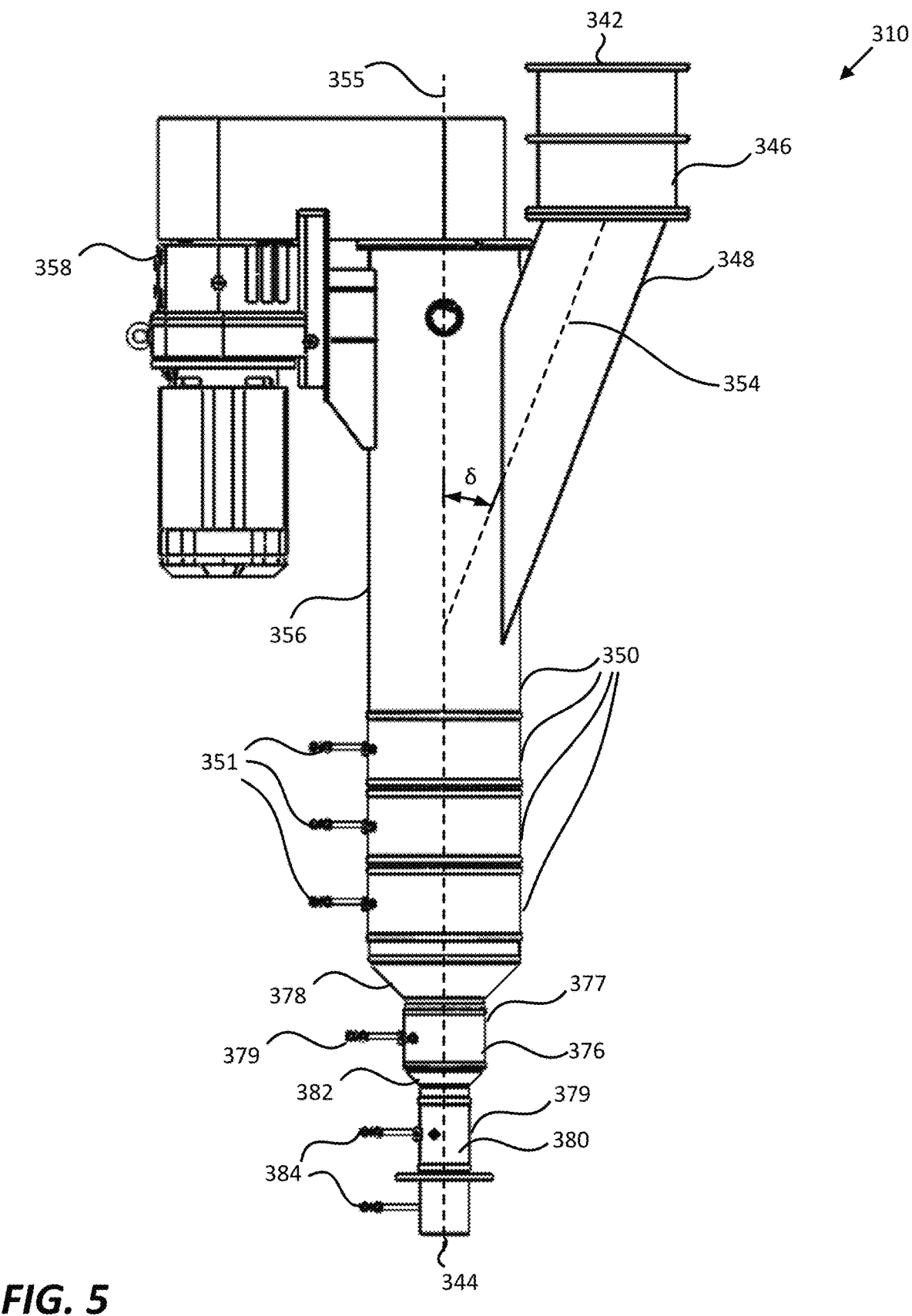
FIG. 5 is a front plan view of heating and compaction unit 310.
Figure 6:
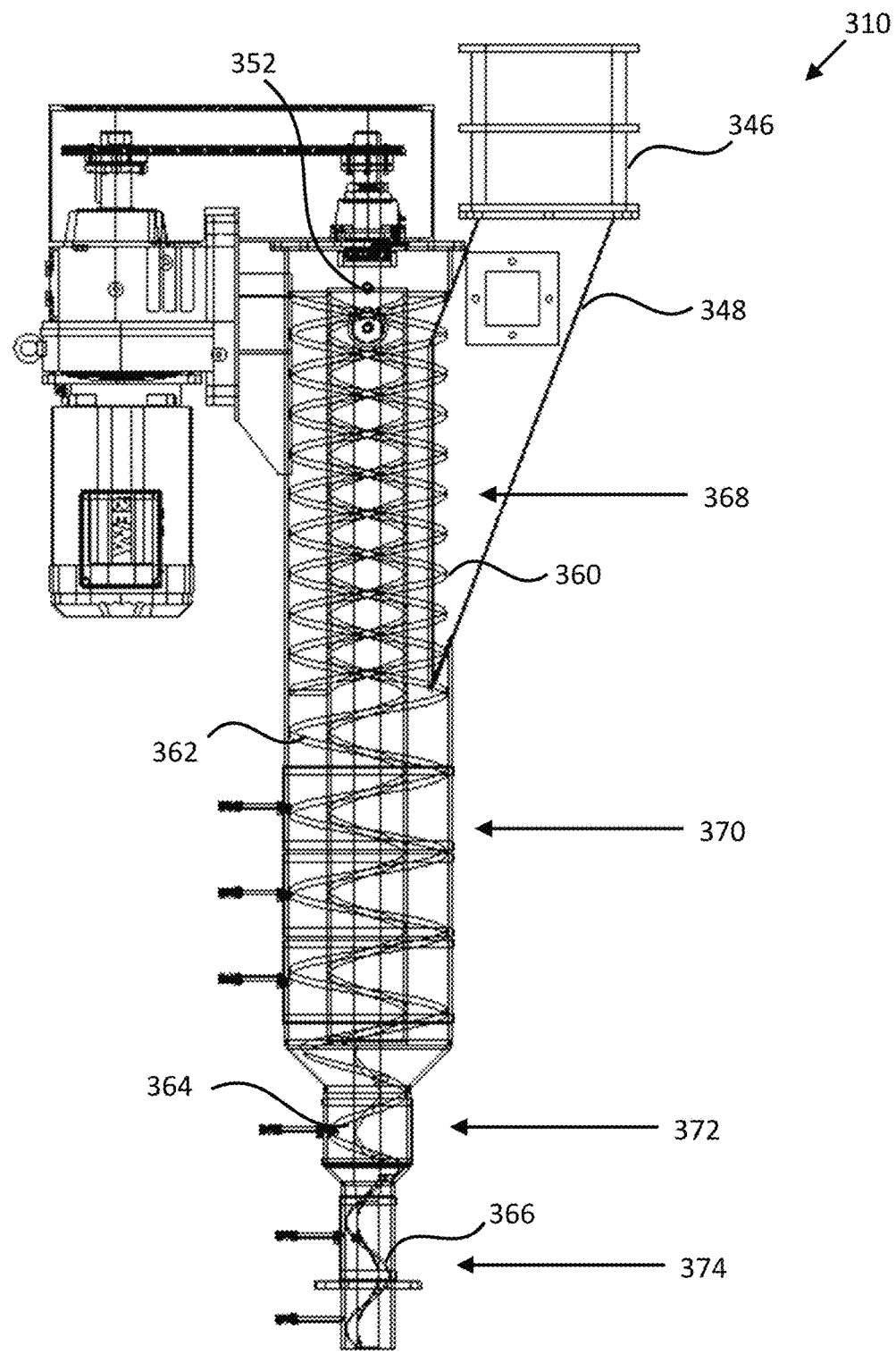
FIG. 6 is a sectional view of FIG. 5.

FIG. 5 and FIG. 6 show exemplary heating and compaction unit 310 and are discussed concurrently below unless otherwise indicated. FIG. 5 is a front plan view of heating and compaction unit 310. FIG. 6 is a sectional view of FIG. 5.

Heating and compaction unit 310 may receive material via inlet 342 and may discharge materials via outlet 344. In the embodiment shown, inlet 342 is located near the uppermost portion of heating and compaction unit 310, and outlet 344 is located at the lowest portion of heating and compaction unit 310.

Auger 352 is supported by and is positioned within heating and compaction unit 310. Generally, auger 352 defines helical fighting with a plurality of fighting portions. Each fighting portion has a different pitch. Auger 352 is coupled to, and rotationally driven by, motor and gearing 358.

A first fighting portion 360 is on an uppermost portion of auger 352 and positioned within the first transport zone 368. The first fighting portion 360 has a double helix configuration.

A second fighting portion 362 is adjacent to the first fighting portion 360 and is positioned within the second transport zone 370. The pitch of the second fighting portion 362 is greater than the pitch of the first fighting portion 360. In various implementations, the pitch of the second fighting portion may be 30%-40%; 30%-35%; 32%-35%; or about 33% greater than the pitch of the first fighting portion 360. As shown, a diameter of the first fighting portion 360 is the same as a diameter of the second flighting portion 362.

A third fighting portion 364 is adjacent to the second fighting portion 362 and is positioned within the third transport zone 372. The pitch of the third fighting portion 364 may be equal to; no more than 5% greater than; no more than 10% greater than; or no more than 20% greater than, the pitch of the second fighting portion 362. As shown, a diameter of the third fighting portion 364 is less than the diameter of the first fighting portion 360 or the diameter of the second fighting portion 362.

A fourth fighting portion 366 is adjacent to the third fighting portion 364 and outlet 344 and is positioned within the fourth transport zone 374. The pitch of the fourth fighting portion 366 may be equal to; no more than 5% greater than; no more than 10% greater than; or no more than 20% greater than the pitch of the third fighting portion 365. As shown, a diameter of the fourth fighting portion 366 is less than the diameter of the third fighting portion 364.

Inlet 342 of heating and compaction unit 310 is defined by an inlet of airlock 346. Accordingly, shredded waste material entering inlet 342 passes into airlock 346. In some instances, airlock 346 may be a multiple-flap type airlock. In those instances, during typical operation, one flap of airlock 346 is usually in the closed position, which allows airlock 346 to maintain a seal. A commercially available example of airlock 346 is a S8 series double-flap type airlock manufactured by Plattco® Corporation (Plattburgh, New York).

An outlet of airlock 346 leads into chute 348. Chute 348 directs material to the first transport zone 368. In some implementations, chute 348 may comprise a coating on an inner surface that contacts shredded waste material. Exemplary coatings may be particularly suited for reducing friction of material sliding along chute 348. An exemplary coating may be Teflon.

As shown, chute 348 is angled relative to a central axis 355 of auger 352. Angle δ in FIG. 5 is defined as the angle between an axis 355 parallel to auger 352 and the central axis 354 of chute 348 that is less than 90°. In various implementations, angle δ may be between 10° and 35°; between 10° and 25°; between 20° and 35°; between 10° and 15°; between 15° and 20°; between 20° and 25°; between 25° and 30°; or between 30° and 35°. In various implementations, angle δ may be no less than 10°; no less than 15°; no less than 20°; no less than 25°; no less than 30°; or no less than 35°. In various implementations, angle δ may be no greater than 35°; no greater than 30°; no greater than 25°; no greater than 20°; or no greater than 15°.

Chute 348 leads into first transport zone 368. First transport zone 368 is at least partially defined by housing 356. Typically, housing 356 is cylindrically shaped. As noted above, first fighting portion 360 of auger 352 has a double helix configuration, which may aid in processing material more quickly than if a single helix was employed.

Second transport zone 370 receives material from first transport zone 368. Second transport zone 370 includes one or more heating elements 350 arranged and configured to heat material passing through second transport zone 370. Second transport zone 370 may include one or more thermocouples 351, which may be used to monitor a temperature of material within second transport zone 370. A system controller, not shown, may receive temperature signals from the one or more thermocouples 351 and adjust an amount of heat provided by one or more heating elements 350.

Third transport zone 372 receives material from second transport zone 370. A diameter of housing 356 in the second transport zone 370 is greater than a diameter of housing 376 in third transport zone 372. In various implementations, the diameter of housing 376 may be 40%-60%; 45%-55%; 48%-52%; 50%; or about 50% of the diameter of housing 356.

Narrowing section 378 transitions from the diameter of housing 356 to housing 376. Material is compacted as material is transported from housing 356 to housing 376. Various transition angles and transition lengths may be used to transition from housing 356 to housing 376. In the embodiments shown, a transition angle is about 45°, although other angles are contemplated.

Third transport zone 372 may include one or more heating elements 377 arranged and configured to heat material passing through third transport zone 372. Third transport zone 372 may include one or more thermocouples 379 which may be used to monitor a temperature of material within third transport zone 372. A system controller, not shown, may receive temperature signals from the one or more thermocouples 379 and adjust an amount of heat provided by one or more heating elements 377.

Fourth transport zone 374 receives material from third transport zone 372 and provides material for discharge via outlet 344. A diameter of housing 376 in the third transport zone 372 is greater than a diameter of housing 380 in fourth transport zone 374. In various implementations, the diameter of housing 380 may be 60%-70%; 62%-68%; 64%-70%; 65%-67%; 66%; or about 66% of the diameter of housing 376.

Narrowing section 382 transitions from the diameter of housing 376 to housing 380. Material is compacted as material is transported from housing 376 to housing 380. Various transition angles and transition lengths may be used to transition from housing 376 to housing 380. In the embodiments shown, a transition angle is about 45°, although other angles are contemplated.

Fourth transport zone 374 may include one or more heating elements 379 arranged and configured to heat material passing through fourth transport zone 374. Fourth transport zone 374 may include one or more thermocouples 384 which may be used to monitor a temperature of material within fourth transport zone 374. A system controller, not shown, may receive temperature signals from the one or more thermocouples 384 and adjust an amount of heat provided by one or more heating elements 379.

Heating elements 350, 377, and 379 may be maintained at temperatures sufficient to melt some, most, or all consumer plastics during operation. In various implementations, heating elements 350, 377, and 379 may be maintained at temperatures between 180° C. and 220° C.; between 180° C. and 210° C.; between 190° C. and 220° C.; between 180° C. and 200° C.; or between 180° C. and 190° C. In various implementations, heating elements 350, 377, and 379 may be maintained at temperatures no less than 180° C.; no less than 185° C.; no less than 190° C.; no less than 195° C.; no less than 200° C.; no less than 205° C.; no less than 210° C.; or no less than 215° C. In various implementations, heating elements 350, 377, and 379 may be maintained at temperatures no greater than 220° C.; no greater than 215° C.; no greater than 210° C.; no greater than 205° C.; no greater than 200° C.; no greater than 195° C.; no greater than 190° C.; or no greater than 185° C.

Reactor and extruder system 112 torrefies and extrudes waste material received from heating and compaction unit 110. Reactor and extruder system 112 integrates a reaction zone and an extrusion zone. A single shaft moves material through the torrefaction and extrusion processes within reactor and extruder system 112.

In a typical configuration, an inlet of reactor and extruder system 112 is positioned below an outlet of heating and compaction unit 110. In such implementations, material flows from the outlet of the heating and compaction unit 110 generally perpendicular to a length of reactor and extruder 112. In some instances, exemplary system 100 may include multiple reactor and extruder systems 112, where each may be operating in parallel.

The reaction portion of reactor and extruder system 112, during typical operation, achieves desired material temperatures and residence times that enable chlorine removal from the solid material. The level of chlorine reduction in the reactor may be determined from a given temperature profile, as described in Z. Xu, J. W. Albrecht, S. S. Kolapkar, S. Zinchik, and E. Bar-Ziv, "Chlorine Removal from U.S. Solid Waste Blends through Torrefaction," Appl. Sci., vol. 10, no. 9, p. 3337, May 2020, and/or Z. Xu, S. Kolapkar, S. Zinchik, E. Bar-Ziv, and A. Mcdonald, "Comprehensive Kinetic Study of Thermal Degradation of Polyvinylchloride (PVC)," Polym. Degrad. Stab., vol. 176, 2020, the entire contents both of which are hereby incorporated by reference. In particular, exemplary aspects of the reactor shaft, pitch length and paddle configurations, impact the heat transfer rate and, accordingly, the temperature profile, which is defined in greater detail below.

Figure 7:
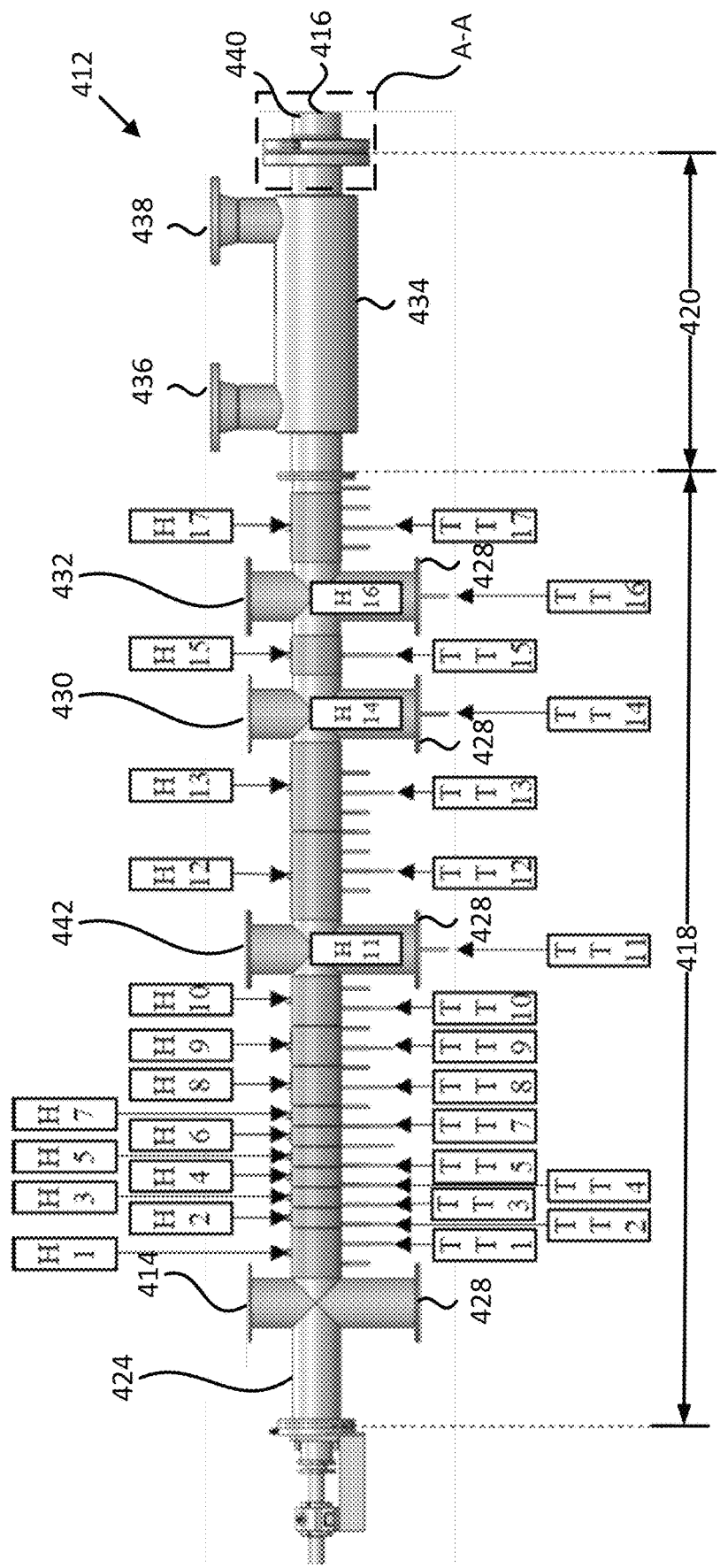
FIG. 7 is a right side plan view of an exemplary reactor and extruder system.
Figure 9A:
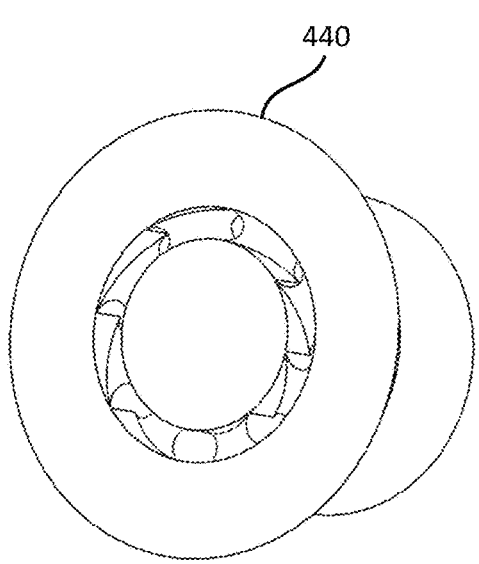
FIG. 9A shows a rear perspective view of an exemplary die used with the shaft shown in FIG. 8B.
Figure 9B:
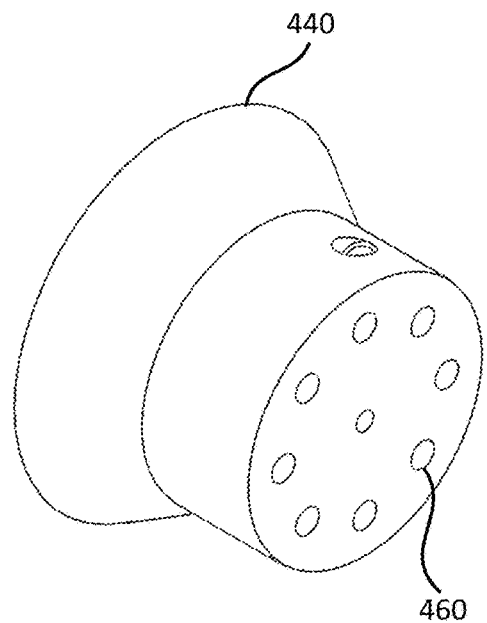
FIG. 9B shows a front perspective view of the die shown in FIG. 9A.
Figure 9C:
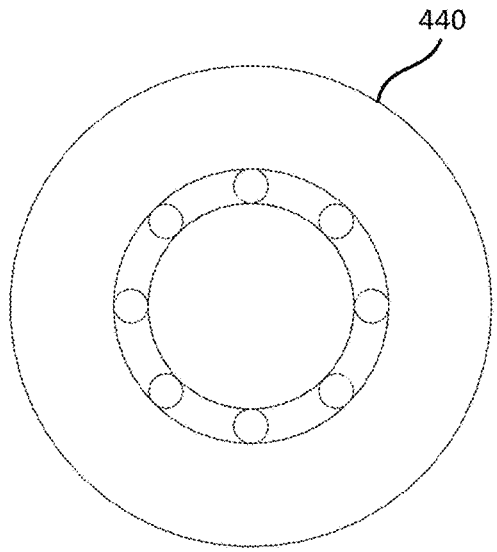
FIG. 9C shows a rear plan view of the die shown in FIG. 9A.
Figure 9D:
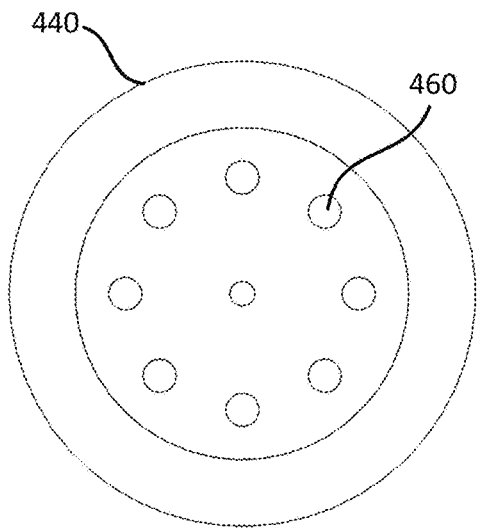
FIG. 9D shows a front plan view of the die shown in FIG. 9A.
Figure 10:
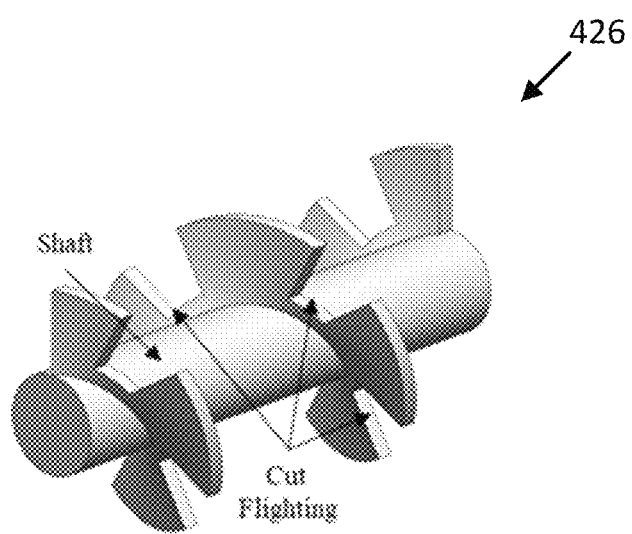
FIG. 10 shows a right side perspective view of a portion of cut fighting, which may be used with the shaft shown in FIG. 8B.
Figure 11:
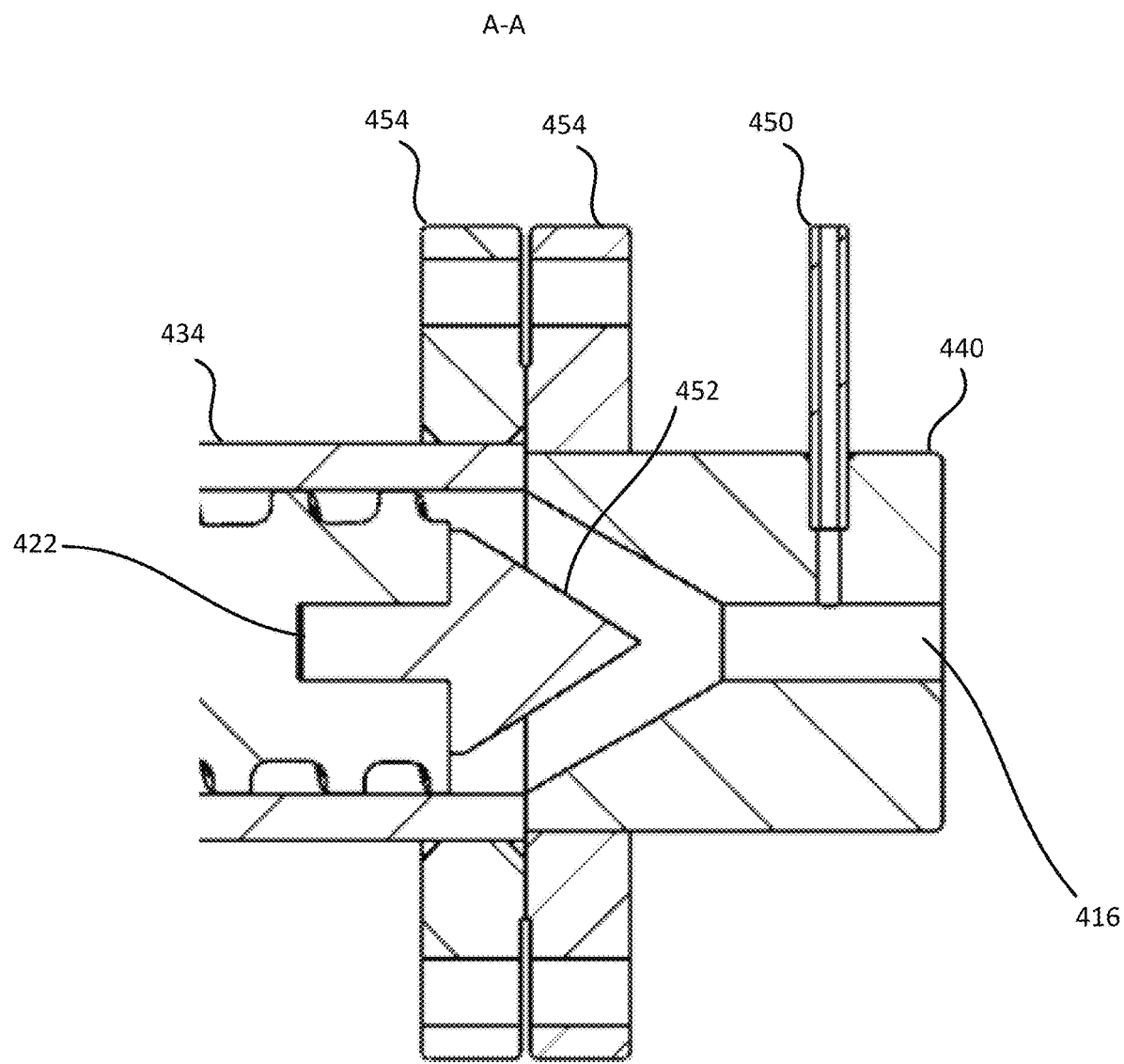
FIG. 11 shows a side sectional view of an end portion of the reactor and extruder system shown in FIG. 7.

FIGS. 7-11 show various aspects of exemplary reactor and extruder system 412 and are discussed concurrently below, unless otherwise noted. FIG. 7 is a right side plan view of reactor and extruder system 412. FIG. 8A shows a right side view with a portion of the reactor housing removed to show various internal components. FIG. 8B shows shaft 422 that is positioned within reactor and extruder system 412. FIG. 9A shows a rear perspective view of an exemplary die used with shaft 422. FIG. 9B shows a front perspective view of an exemplary die used with shaft 422. FIG. 9C shows a rear plan view of an exemplary die used with shaft 422. FIG. 9D shows a front plan view of an exemplary die used with shaft 422. FIG. 10 shows a right side perspective view of a portion of cut fighting, which may be used with exemplary shaft 422. FIG. 11 shows a side sectional view of an end portion of reactor and extruder system 412.

Exemplary reactor and extruder system 412 receives material via inlet 414 and discharges material via outlet 416. Broadly, reactor and extruder system 412 comprises a reaction portion 418 and an extrusion portion 420. Shaft 422 moves material from inlet 414 through reaction portion 418 and extrusion portion 420 and discharges the material via outlet 416. Shaft 422 is driven by a motor unit, which is not shown in the figures.

The exemplary reactor and extruder system 412, in alternate implementations, may have different numbers of pitches and/or different diameters. The principles behind the temperature profiles generated by exemplary reactor and extruder system 412, which may relate to shaft 422 rotation frequency, axial distance, cut flight configuration, pitch over diameter configuration, heat transfer rate, etc., may be used to scale up or down alternate implementations.

Shaft 422 comprises various different flights. When shaft 422 is positioned within reactor and extruder housing 424, the various flights correspond to various zones of reactor and extruder system 412. As shown, reaction portion 418 comprises Zone 1 and Zone 2, and extrusion portion 420 comprises Zone 3 and Zone 4. Each auger in each zone is coaxial because shaft 422 supports each auger.

In some implementations, shaft 422 comprises a double pitch auger in Zone 1. The double pitch auger may facilitate a smooth transition of material from inlet 414 to Zone 2. In some implementations, shaft 422 may comprise at least one full pitch and up to three full pitches of the double pitch auger in Zone 1. It will be appreciated that a number of pitches in Zone 1 may vary depending on the scale of reactor and extruder system 412.

In some implementations, shaft 422 comprises a cut flight auger 426 in Zone 2. Zone 2 may be configured to increase residence time and/or increase mixing of material. A portion of cut flight auger 426 is shown in FIG. 10. In some implementations, shaft 422 may comprise at least one full pitch and up to 50 full pitches of cut flight auger 426 in Zone 2. It will be appreciated that a number of pitches in Zone 2 may vary depending on the scale of reactor and extruder system 412.

In some implementations, cut flight auger 426 has between 20% and 40% cut; between 20% and 30% cut; between 30% and 40% cut; between 20% and 25% cut; or between 35% and 40% cut. Percentage cut area may be determined by dividing the cut area of a flight by the total flight area of the auger, and multiplying that by 100. In some implementations, cut flight auger 426 has no less than 20% cut; no less than 25% cut; no less than 30% cut; no less than 35% cut; or no less than 40% cut. In some implementations, cut flight auger 426 has no more than 40% cut; no more than 35% cut; no more than 30% cut; no more than 25% cut; or no more than 20% cut.

In some implementations, shaft 422 comprises a single pitch auger in Zone 3. In some implementations, shaft 422 may comprise two full pitches of the single pitch auger in Zone 3.

In some implementations, shaft 422 comprises a variable pitch auger in Zone 4. Zone 3 and Zone 4 may be configured to compact material to densities suitable for storage and transportation while maintaining low L/D (length/diameter) ratios. Typically, the variable pitch auger in Zone 4 is particularly suited for extrusion operations.

Inlet 414 is arranged at a right angle to a central axis of shaft 422. Outlet 416 is arranged parallel to the central axis of shaft 422.

Portions of housing 424 are heated by a plurality of heating units. Typically, the plurality of heating units are in electrical communication with a control unit, not shown. The control unit may adjust an amount of heat provided by each heater, and the control may be by individual heater, by groups of heaters, or by the entire heater assembly.

In the embodiment shown, heating units H1-H17 are arranged around an outer surface of housing 424 and spaced along the length of the reactor. In the embodiment shown, the relative spacing between heaters increases along the length of the reactor (i.e., along the length from the inlet 414 to the outlet 416). Heating units H1-H17 may be electric band heaters.

During typical operation, the plurality of heating units may be operating at the same or substantially similar temperature. It will be appreciated that the amount of heat transfer will vary along the length of the reactor, and the greatest amount of heat transfer occurs at the most upstream heaters.

In some implementations, each band heater may be operated at between 460V-500V; between 470V-490V; or about 480V. In some implementations, each band heater may have various capacities, such as between 2 kW to 5 kW. In the embodiment shown, heating units H1-H17 are arranged in five sets: (a) set 1, comprising heaters H1-H10 between inlet 414 and port 442, includes 10 heaters of total 30 kW in a sequence of 1×5 kW, 6×2 kW, 2×4 kW, and 1×5 kW; (b) set 2, located between port 442 and 430, comprises heaters H12 and H13 and has a total 9 kW; (c) set 3, located between port 430 and port 432, comprises 1 heater, H15, for a total 4 kW; (d) set 4, located after port 432, comprises 1 heater, H17, for a total 6.5 kW and (e) set 5 comprises 3 heaters, H11, H14, and H16, located in the access port bottoms with 2.5 kW each.

Reactor and extruder system 412 may comprise a plurality of temperature monitoring devices, such as thermocouples, spaced along the length of the housing 424. The plurality of temperature monitoring devices are in electrical communication with the control unit. The control unit may be programmed to use temperature signals received from one or more of the temperature monitoring devices to adjust an amount of heat provided by each heater, and the control may be by individual heater, by groups of heaters, or by the entire heater assembly.

In some instances, reactor and extruder system 412 may comprise one or more service ports 428. Service ports 428 might be used during maintenance and/or cleaning operations.

Reactor and extruder system 412 may comprise one or more off gas outlets 430, 432. In some implementations, off gas(es) exit outlet 430. In some implementations, off gas(es) exit outlet 432. Typically, the one or more off gas outlets 430, 432 are positioned no less than about ⅔ or no less than about ¾ of the length of reaction portion 418. In some implementations, gas outlet 430 and/or gas outlet 432 may be in fluid communication with one or more gas cleanup systems, not shown. Exemplary gas cleanup systems may comprise dry sorbent injection, one or more condensers, and/or a demister filter unit.

Extruder 434 includes a temperature control assembly. In various implementations, extruder 434 may be configured for co-current flow of heating fluid or for counter-current flow of heating fluid. As shown, extruder 434 includes heating fluid inlet 436, which receives heating fluid used to heat extrusion portion 420. As shown, extruder 434 also includes heating fluid outlet 438.

In some implementations, extruder 434 may use mineral oil as the heating fluid. A commercially available temperature control assembly is Heat Exchange and Transfer Inc, PA, USA, using Therminol XP® oil.

Extruder 434, because of the heating fluid, may maintain various temperatures during operation. For instance, extruder 434 may have heating fluid temperature between 160° C. and 180° C.; between 160° C. and 170° C.; between 170° C. and 180° C.; or between 165° C. and 175° C. In various instances, extruder 434 may have a heating fluid temperature of no less than 160° C.; no less than 165° C.; no less than 170° C.; or no less than 175° C. In various instances, extruder 434 may have a heating fluid temperature no greater than 180° C.; no greater than 175° C.; no greater than 170° C.; or no greater than 165° C.

Near the end of extruder 434, material may be fully densified and reach intrinsic density, and may have no pores. Material near the end of extruder 434 is guided to a die 440. Accordingly, the compressed material at die 440 may create a plug or airlock, which may prevent penetration of oxygen into the reaction portion 418. Material is extruded through die 440 into rods.

Die 440 may comprise various numbers of exit holes or channels 460. In some instances, die 440 may comprise between 4-8 holes; 5-8 holes; 4-6 holes; 6-8 holes; 7-8 holes; 4 holes; 5 holes; 6 holes; 7 holes; or 8 holes.

FIG. 11 shows a side sectional view of portion A-A shown in FIG. 7. In the embodiment shown, extruder 434 housing is joined to die 440 via flanges 454. Guiding cone 452 protrudes into an opening defined by die 440.

Sensor unit 450 obtains one or more parameters of material flowing through outlet 416. In some instances, sensor unit 450 obtains pressure measurements of material flowing through outlet 416. In some instances, sensor unit 450 obtains temperature measurements of material flowing through outlet 416 in addition to pressure measurements.

Referring again to FIG. 1, cutting unit 114 receives material extruded by reactor and extruder system 112 and cuts the material into pellets. Cutting unit 114 typically is connected to an outlet of reactor and extruder system 112. Cutting unit 114 comprises a plurality of blades whose rotation is correlated to pressure of material flowing through a die at the exit of the reactor and extruder system 112.

The blades of cutting unit 114 are rotated by a shaft or spring tensioned unit whose rotational speed may be configured to generate uniform lengths of pellets. As used herein, uniform pellet length means each pellet has a length within 10%; within 8%; within 5%; within 3%; or within 1% of an average pellet length, for a given number of pellets obtained within a given time.

Figure 12:
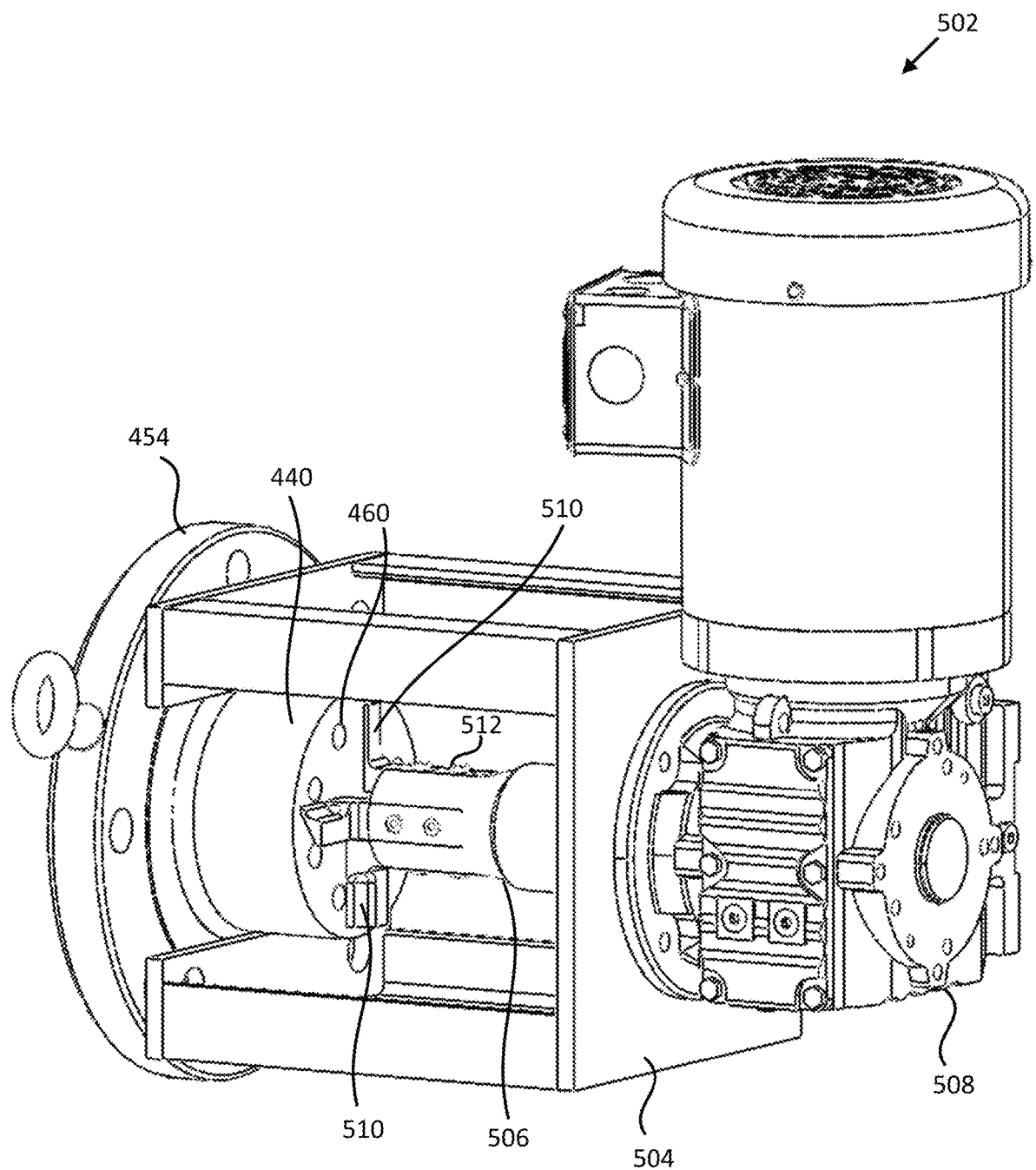
FIG. 12 shows a front right perspective view of an exemplary cutting unit.

FIG. 12 shows a front right perspective view of an exemplary cutting unit 502. Cutting unit 502 is coupled to flange 454 via housing 504. Housing 504 supports spring-tensioned cutting portion 506 and motor and gearbox 508. Spring tensioned cutting portion 506 interfaces with extrusion die 440 via blades 510.

As shown, cutting unit 502 comprises two blades 510. In the configuration shown, the blades 510 are arranged to extend in opposite directions from spring tensioned holder 512 to be 180° from each other. Other embodiments may include four blades 510, where each blade 510 is arranged to be 90° from the adjacent blade 510. In some implementations, cutting unit 502 may comprise one or more blades, which may be determined according to the mass flow outlet and the number of die holes.

Blades 510 are rotated by motor and gearbox 508. As discussed in greater detail with reference to FIG. 13, a rotational frequency of blades 510 is related to material die pressure, which may be measured using sensor unit 450.

As blades 510 rotate, the blades 510 cut material exiting die 440 via channels 460. In the embodiment shown, die 440 comprises eight channels 460 although, as discussed above, different quantities of channels 460 are contemplated.

Figure 13:
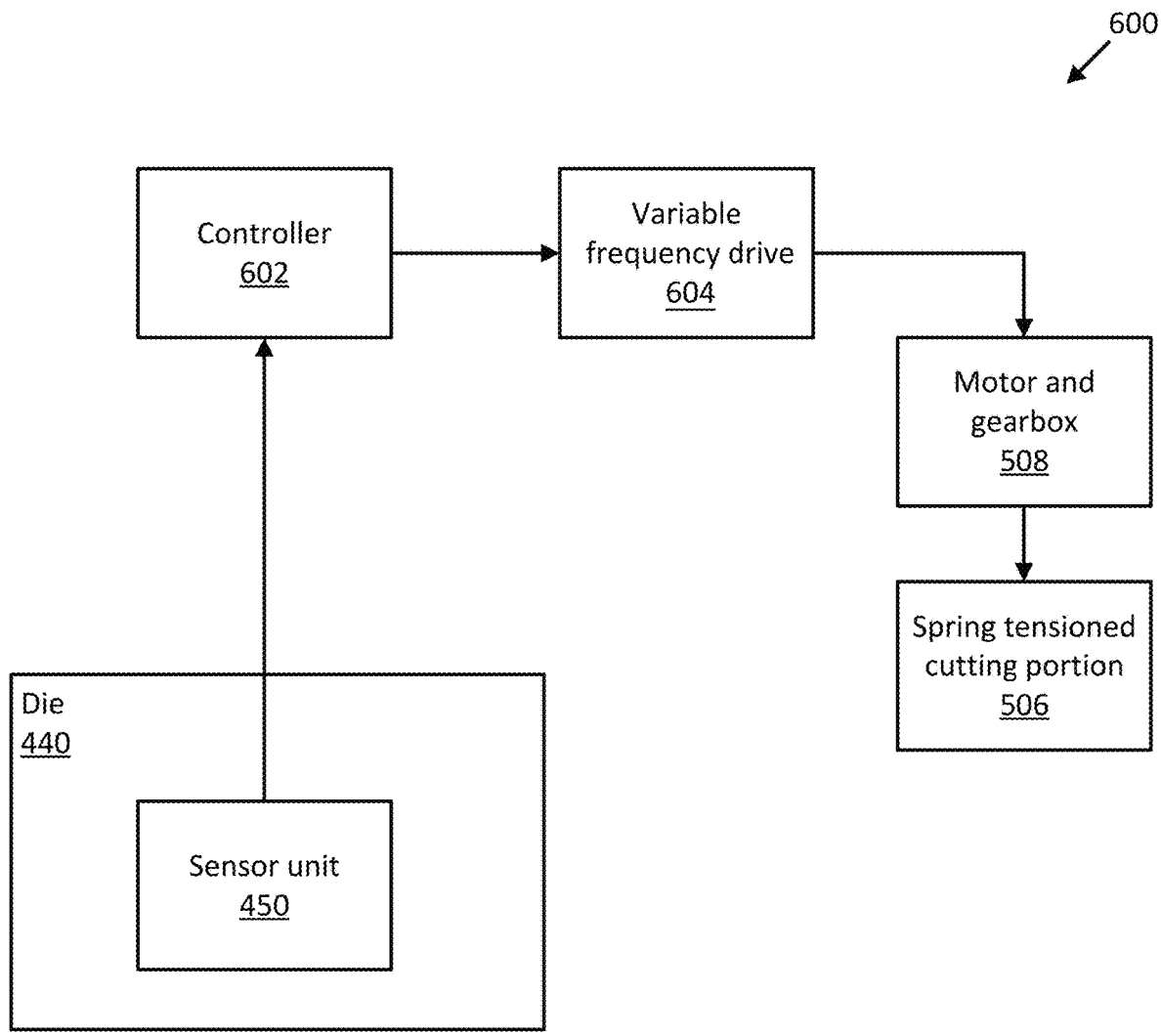
FIG. 13 schematically depicts an exemplary cutting unit control system.

FIG. 13 schematically depicts exemplary cutting unit control system 600. In the embodiment shown, controller 602 is in communication with sensor unit 450 and variable frequency drive 604. In some implementations, controller 602 may be a programmable logic controller. Controller 602 comprises memory and a processing unit. The memory stores instructions that, when executed by the processing unit, cause various operations of cutting unit 502 described herein. The memory also stores a lookup table or other data store correlating operation of the cutting unit 502, pressure of extruded material, and a motor speed for operating the cutting unit 502.

As mentioned above, die pressure sensor unit 450 obtains pressure of material flowing through die 440. Sensor unit 450 communicates one or more pressure signals to controller 602. Controller 602 correlates the received pressure signals to operational speeds of spring tensioned cutting portion 506. Controller 602 communicates a speed or motor power to variable frequency drive 604.

Variable frequency drive 604 controls an operation of motor and gear box 508. Based on communications received from controller 602, variable frequency drive 604 may adjust a rotational speed of motor and gear box 508. Motor and gear box 508 is operatively attached to spring tensioned cutting portion 506 and, accordingly, causes rotation of blades 510 which are a part of spring tensioned cutting portion 506.

Referring again to FIG. 1, pellets cut by cutting unit 114 may be provided to pellet cooling unit 118. Conveying unit 116, which may be a bucket elevator in certain implementations, may convey pellets provided by cutting unit to the pellet cooling unit 118.

Figure 14:
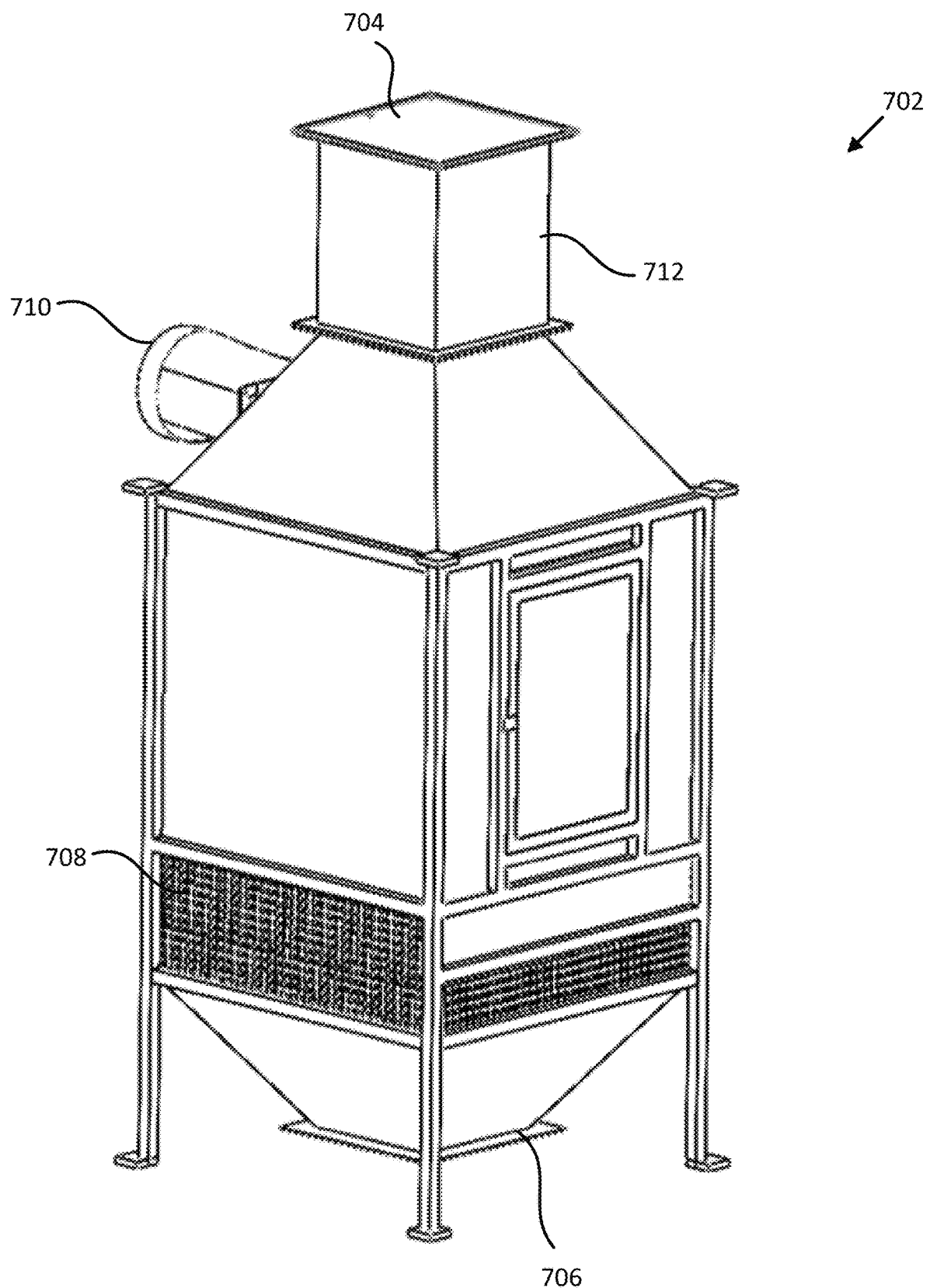
FIG. 14 is a front right perspective view of an exemplary pellet cooler.

FIG. 14 is a front right perspective view of exemplary pellet cooler 702. Pellet cooler 702 includes material inlet 704 and material outlet 706. Pellet cooler 702 also includes air inlet 708 and air outlet 710.

Generally, pellet flow through pellet cooler 702 is a system closed to the environment, which may be enabled by one or more airlocks. For instance, material inlet 704 may be an inlet to airlock 712. In some instances, airlock 712 may be a multiple-flap type airlock. In those instances, during typical operation, one of the two flaps of airlock 712 is usually in the closed position, which allows airlock 712 to maintain a seal.

Air enters pellet cooler 702 via air inlet 708, which is positioned on one or more side walls of pellet cooler 720. Air then flows countercurrent relative to the flow of pellets entering from the top of pellet cooler 702. The air may then be dragged by a blower through a cyclone unit that collects fine particles. Then air may pass through a bag filter to block particulates under a given size from being released to the environment. In some instances, particulates having a size less than 0.5 microns may be blocked by the bag filter.

IV. Example Methods of Operation

Figure 15:
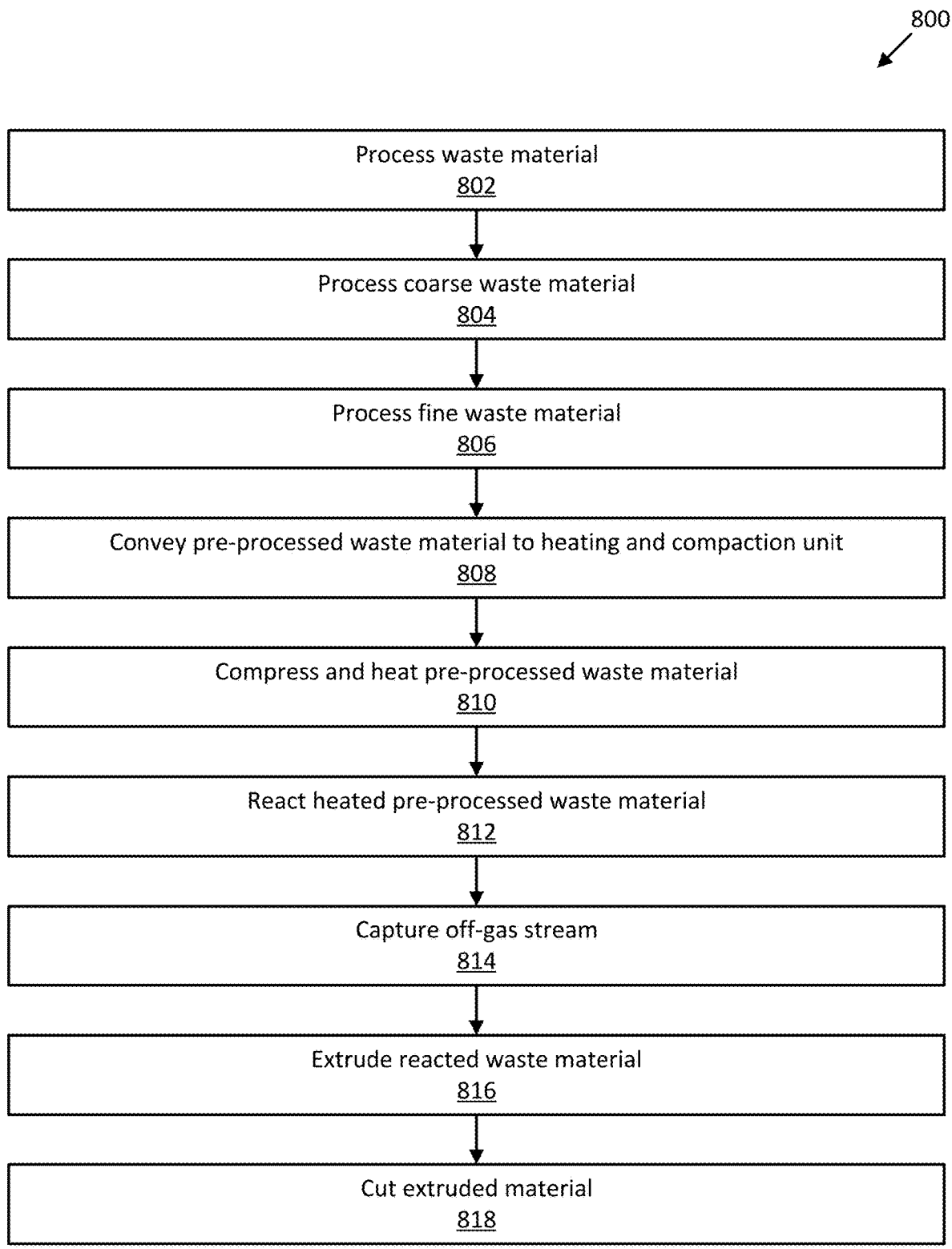
FIG. 15 is a flowchart of an example method for operating a reactor system.

FIG. 15 is a flowchart of an example method 800 for operating a reactor system. Exemplary system 100 may be used to perform one or more operations of method 800. The exemplary method 800 includes processing waste material (operation 802), processing coarse waste material (operation 804), processing fine waste material (operation 806), conveying pre-processed waste material to a heating and compaction unit (operation 808), compressing and heating pre-processed waste material (operation 810), reacting heated pre-processed waste material (operation 812), capturing an off-gas stream (operation 814), extruding reacted waste material (operation 816), and cutting extruded material (operation 818). Other embodiments may include more or fewer operations.

Method 800 may begin by receiving waste material and processing the waste material to generate a coarse size waste material (operation 802). Exemplary waste material comprises biogenic material and plastic material. Examples of biogenic material and plastic material are discussed in greater detail above. Processing the waste material (operation 802) may further comprise removing one or more non-organic and non-plastic materials, such as metals, stones, and glass, from the waste material. One or more shredding units as discussed above may be used to generate the coarse size waste material.

In some instances, the coarse size waste material may have a size no greater than 310 millimeters (mm); no greater than 305 mm; no greater than 300 millimeters (mm); no greater than 295 mm; no greater than 290 mm; no greater than 285 mm; no greater than 280 mm; or no greater than 275 mm. In some instances, the coarse size waste material may have a density between 40 to 70 $kg/m^3$.

Next, the coarse waste material is processed (operation 804) to generate fine size waste material. One or more shredding units as discussed above may be used to generate the fine size waste material. In some instances, the fine size waste material has a size no greater than 60 mm; no greater than 55 mm; no greater than 53 mm; no greater than 50 mm or no greater than 48 mm.

Then the fine size waste material is processed (operation 806) to generate pre-processed waste material. One or more shredding units as discussed above may be used to generate the pre-processed waste material. The pre-processed waste material may have an aspect ratio between 0.8:1 and 1.2:1; between 0.9:1 and 1.1:1; between 0.95:1 and 1.05:1; between 0.98:1 and 1.02:1; or 1:1. The pre-processed waste material may have a largest dimension of less than 5 mm; less than 4.5 mm; or less than 4 mm. In some instances, a density of the pre-processed waste material is between 105 $kg/m^3$ and 120 $kg/m^3$.

In some implementations, when processing the fine size waste material to generate the pre-processed waste material (operation 806), the one or more shredding units are operated during 806 at a speed less than 500 rpm; less than 450 rpm; less than 400 rpm; less than 350 rpm; less than 300 rpm; less than 250 rpm; or less than 200 rpm.

Next, the pre-processed waste material is conveyed to a heating and compaction unit (operation 808). In some instances, a conveying unit, such as a bucket elevator, conveys the pre-processed waste material to a hopper. In some instances, a conveying unit, such as a bucket elevator, conveys the waste material from the hopper to the heating and compaction unit. As discussed in greater detail above, the hopper may include two or more parallel, independently driven variable pitch augers, which may be used to convey the pre-processed waste material.

Material from the hopper may be provided to an airlock portion of the heating and compaction unit. In some instances, the airlock comprises two compartments (top and bottom), and under each compartment there may be a flap. Material is accumulated in the top compartment while the top compartment flap is in the closed position. After a given time period (which may be between 1 and 10 seconds), the top compartment flap opens for a period of time (which may be between 1 and 5 seconds) and the material is dropped by gravity to the lower compartment. Then the top compartment flap closes. After a given time period (which may be between 1 and 10 seconds) the flap of the bottom compartment opens for a period of time (which may be between 1 and 5 seconds) and the material is dropped by gravity to the chute 348. Then the bottom compartment flap closes. Before the cycle is repeated, there may be a pause (which may be between 1 and 5 seconds).

Then the pre-processed waste material flowing out of the airlock is heated and compacted (operation 810) in one or more heating and compaction units. Exemplary heating and compaction units are described in greater detail above.

Heating elements positioned on the heating and compaction units typically operate at temperatures between 180° C. and 220° C.; between 180° C. and 210° C.; between 190° C. and 220° C.; between 180° C. and 200° C.; or between 180° C. and 190° C. In various implementations, heating elements may be maintained at temperatures no less than 180° C.; no less than 185° C.; no less than 190° C.; no less than 195° C.; no less than 200° C.; no less than 205° C.; no less than 210° C.; or no less than 215° C. In various implementations, heating elements may be maintained at temperatures no greater than 220° C.; no greater than 215° C.; no greater than 210° C.; no greater than 205° C.; no greater than 200° C.; no greater than 195° C.; no greater than 190° C.; or no greater than 185° C.

Next, the heating and compaction unit provides the heated and compressed waste material to one or more reactor and extruder systems (operation 812). As discussed in greater detail above, exemplary reactor and extruder systems comprise a single shaft including various auger types to move material through the reactor and extruder systems.

In some instances, the reactor and extruder systems are operated such that a residence time of material in the reactor portion is between 2 minutes and 30 minutes; between 2 minutes and 15 minutes; between 15 minutes and 30 minutes; between 2 minutes and 10 minutes; between 10 minutes and 20 minutes; between 2 minutes and 7 minutes; between 2 minutes and 5 minutes; or between 2 minutes and 4 minutes. In some instances, the reactor and extruder systems are operated such that a residence time of material in the reactor portion is no less than 2 minutes; no less than 3 minutes; no less than 5 minutes; no less than 7 minutes; no less than 10 minutes; no less than 15 minutes; no less than 20 minutes; or no less than 25 minutes. In some instances, the reactor and extruder systems are operated such that a residence time of material in the reactor portion is no greater than 30 minutes; no greater than 25 minutes; no greater than 20 minutes; no greater than 15 minutes; no greater than 10 minutes; no greater than 8 minutes; no greater than 6 minutes; no greater than 4 minutes; or no greater than 3 minutes.

In some instances, the reactor portion of the reactor and extruder system heats the material to a temperature between 280° C.-500° C.; between 280° C. and 375° C.; between 375° C. and 500° C.; between 280° C. and 305° C.; between 300° C. and 325° C.; between 325° C. and 375° C.; between 375° C. and 400° C.; between 400° C. and 425° C.; between 425° C. and 450° C.; or between 450° C. and 500° C. In some instances, the reactor portion of the reactor and extruder system heats the material to a temperature no less than 280° C.; no less than 295° C.; no less than 300° C.; no less than 320° C.; no less than 350° C.; no less than 375° C.; no less than 400° C.; no less than 425° C.; no less than 450° C.; or no less than 475° C. In some instances, the reactor portion of the reactor and extruder system heats the material to a temperature no greater than 500° C.; no greater than 475° C.; no greater than 450° C.; no greater than 425° C.; no greater than 400° C.; no greater than 375° C.; no greater than 350° C.; no greater than 325° C.; no greater than 315° C.; no greater than 305° C.; or no greater than 295° C.

As material passes through the reactor portion, an off-gas stream may be captured from the reactor (operation 814). In some instances, the off-gas stream comprises at least one chlorine (Cl) species. As discussed above, off-gas is captured after at least ⅔ of a length of a reaction portion of the reactor and extruder system.

As the material moves through the reaction portion, the shaft and augers move the material to the extrusion portion of the reactor and extruder system (operation 816). Extruding the reacted waste material (operation 816) may include heating the extruder to a temperature between 160° C. and 180° C.; between 160° C. and 170° C.; between 170° C. and 180° C.; or between 165° C. and 175° C. In various instances, extruding the reacted waste material (operation 816) may include heating the extruder to a temperature of no less than 160° C.; no less than 165° C.; no less than 170° C.; or no less than 175° C. In various instances, extruding the reacted waste material (operation 816) may include heating the extruder to a temperature no greater than 180° C.; no greater than 175° C.; no greater than 170° C.; or no greater than 165° C.

As material is extruded through an outlet of the reactor and extruder system, the extruded material is cut (operation 818). During operation, a controller may determine a pressure of material being extruded through a die. A pressure sensor unit in a die near or at the outlet measures a pressure of material passing through the die and out of the outlet. The pressure sensor unit communicates the measured pressure to a controller. The controller correlates the received pressure signal to a rotational frequency of the cutting unit. In some instances, the controller may use a look up table or other data store to make a correlation.

Then the controller determines a signal to provide to a variable frequency drive that is in communication with the motor that drives the cutting unit. Upon receiving the signal from the controller, the variable frequency drive provides an output, such as a power signal, which may include correlating the communication from the controller to a motor speed, to the motor that results in a particular motor speed and, in turn, a rotational speed of the blades of the cutting unit.

In some instances, example method 800 further comprises providing the cut pellets to a pellet cooling unit. In some instances, a conveying unit, such as a bucket elevator, may be used to convey the cut pellets from the cutting unit to the pellet cooler. In some instances, the cut pellets are provided to an airlock that discharges the cut pellets into the pellet cooler. The cooler airlock operates according to the mass flow rate of the pellets produced, to enable smooth and undisturbed flow of the pellets. The rotation frequency of the airlock may be determined by the airlock vane volumes and the pellet bulk density, such that the rate of conveying the pellets will be larger than the actual mass flow rate of the pellets to the airlock.

Cooling the pellets may include providing an air stream or water stream to an input of the pellet cooler and collecting an air stream output from an air outlet of the pellet cooler. The air stream is provided to be counter-current to a flow of pellets. The air may then be dragged by a blower through a cyclone unit that collects fine particles. Then air may pass through a bag filter to block particulates under a given size from being released to the environment. In some instances, particulates having a size less than 0.5 microns may be blocked by the bag filter. In some instances, water may be provided from the top of the cooler by water nozzles and drained at the bottom of the cooler.

V. Experimental Examples

Exemplary systems were constructed and various experiments were conducted. Details regarding the materials, systems, and experiments are discussed below.

A. Materials

Figure 16C:
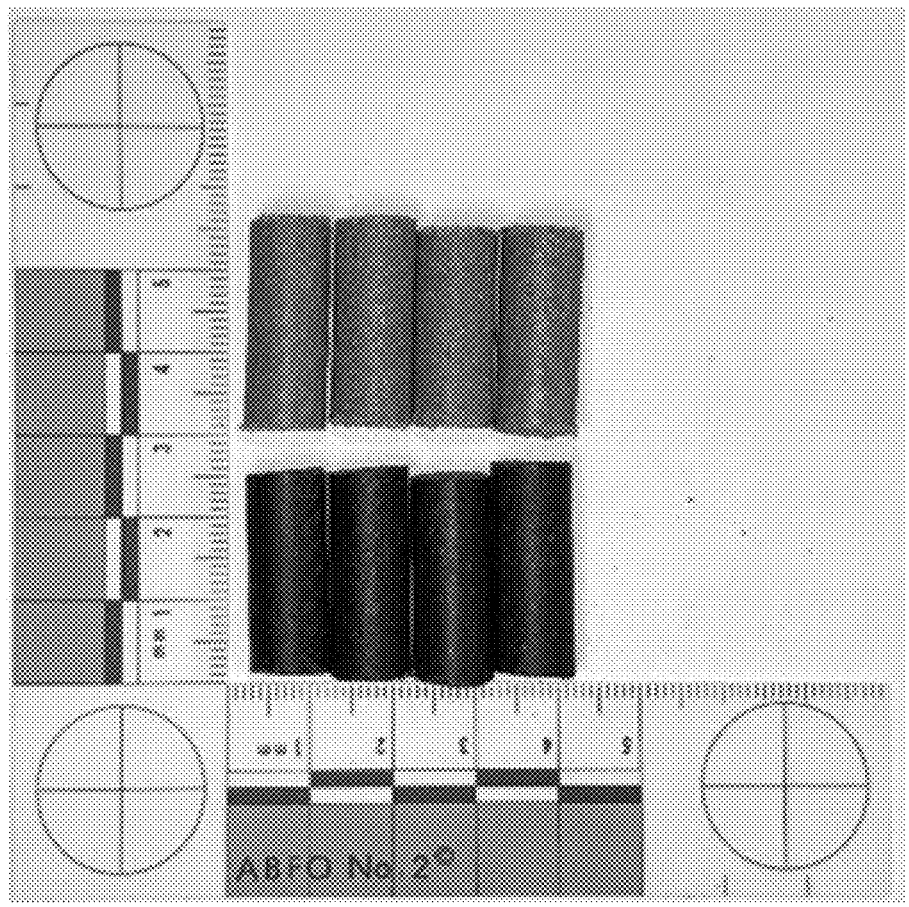
FIG. 16C shows extruded pellets produced at different levels of torrefaction in the experimental system.

As plastic-fiber waste combinedly represent 30.2% of the 146.1 million tons of landfilled materials in U.S., a blend of paper and plastic waste was selected to represent the waste stream. FIG. 16A shows the presorted mixed fiber-plastic feedstock used in the experimental study. The feedstock is a blend of fiber-plastic wastes which is pretreated by the removal of stones, glass, and metals. The material was supplied by Convergen Energy LLC. The blend ratio of fiber to plastic used in the study included 40% plastic and 60% fibers. The main types of the plastics identified using an FTIR analysis were LDPE, HDPE, PP, PET, and traces of Nylon while identified fibers mainly comprised of paper, cardboard, carton, etc. The density of the received material prior to third shredding stage (as received from Convergen Energy) is between 50 to 70 kg/m$^3$. FIG. 16B shows the feedstock after the final shredding stage (Equipment 1) shown in FIG. 17. FIG. 16C shows extruded pellets produced at different levels of torrefaction in the experimental system.

FTIR spectroscopy was used to identify the types of fiber and plastics present in the blend of incoming materials using a Thermo-Scientific Nicolet Summit Pro spectrometer with an attenuated total reflection (ATR) accessory (Zn—Se crystal, iD5). Hundreds of randomly chosen pieces were analyzed using OMNIC V-9 software package, plastic standards (low-density polyethylene from Rainer Plastics, Inc., high-density polyethylene from Equistar Petrothene LB01000, and polypropylene (PP) from Amcor), and Aldrich, Hummel, and Nicolet spectral libraries. Analysis was carried on 30 randomly chosen pieces using an FTIR spectrometer (Thermo-Scientific Nicolet Summit Pro) with an attenuated total reflection (ATR) accessory (ZnSe crystal, iD5). OMNIC V9 software, plastic standards (low-density polyethylene (LDPE) from Rainer Plastics Inc, high-density polyethylene (HDPE) from Equistar Petrothene LB01000, and polypropylene (PP) from Amcor), and Aldrich, Hummel, and Nicolet spectral libraries were used to analyze the data.

The main types of the plastics identified using an FTIR analysis were Low-density Polyethylene (LDPE), High-density Polyethylene (HDPE), Polypropylene (PP), Polyethylene Terephthalate (PET), and traces of Polyamides (Nylon), while identified fibers mainly comprised of paper, cardboard, and carton.

B. Experimental System

Figure 17:
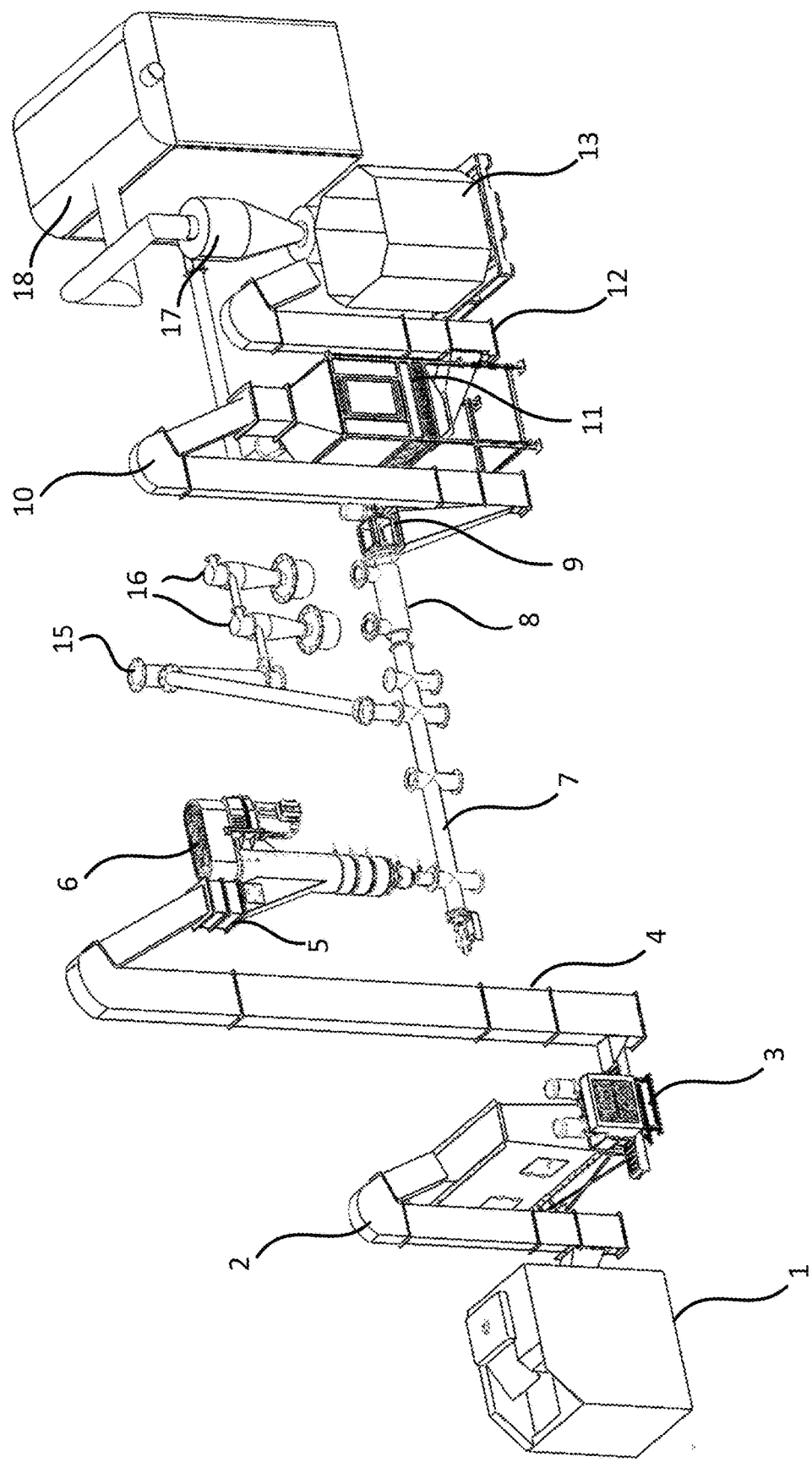
FIG. 17 shows a schematic of the experimental integrated paddle-extrusion torrefaction system.

The scheme of the experimental integrated paddle-extrusion torrefaction system is presented in FIG. 17. FIG. 17 omits various components, such as a heat management system.

The feedstock is introduced in a shredder (1) where the feedstock is shredded to a ~3 mm size (see FIG. 16B) and then conveyed using bucket elevator $B_1$ (2) to a live bottom hopper (3) that monitors the feed rate further downstream. This is followed by material conveying by a bucket elevator $B_2$ (4) into airlock (5) that feeds heating and compaction unit (6) that preheats and densifies the material and creates an air seal preventing air entering the reactor (7). The material then flows into the reactor (7), where the material mixes, heats up, and undergoes a thermal decomposition through torrefaction. The torrefied material in the reactor flows into the extruder (8), which densifies the torrefied material into long rods. The extruder temperature is controlled by a heating/cooling system (not shown) using oil (Therminol XP) as heat transfer fluid.

The rods are cut into pellets of predetermined size using the cutter (9). Note that the reactor is continuously purged by nitrogen (not shown) to ensure an oxygen-free environment, and an induced-draft (ID) fan removes the off-gases into a furnace that burns the biogenic material in this stream. The cut pellets are conveyed using a bucket elevator $B_3$ (10) to the pellet cooler (11) for cooling. The cooled pellets are conveyed again using bucket elevator $B_4$ (12) to the pellet storage box (13). We note that the extruder outlet also acts as an airlock to prevent air from entering the reactor. Air exits pellet cooler (11) and is dragged by a blower through a cyclone (17) to collect fines. Air then passes through a bag filter (18) to block particulates under 0.5 micron from being released to the environment.

The gas stream generated from the torrefaction process is cleaned by passing the gas stream through Dry Sorbent Injection (DSI) (15) and two cyclones (16) connected in series to a gas cleanup system (not shown). We note that the gas stream can be utilized to provide some of the process energy. The following sections detail various components of the experimental system.

1. Material Pre-Processing

The communication was carried in three stages: First, the material is delivered to the tipping floor and pre-mixed. This step is followed by metal and stone removal. The material is then shredded as follows: a. Shredding Stage 1 (≤300 mm) b. Shredding Stage 2 (≤50 mm), and c. Shredding Stage 3 (≤3 mm). The final stage shredding of the industrial residues is performed using Allegheny cross-cut shredder (Model: 16-75CX). The shredder included four key components: (a) Input Conveyor (b) Cutting Assembly (c) Output Conveyor, and (d) Dust and Sound Enclosure.

Shredding starts with feedstock from the earlier process being delivered on a conveyor operating at an input speed of 23 m/min. This input conveyor feeds the material inside the cutting assembly powered using a 7.5 kW motor. After passing through cutters the material is cross-cut and reduced to a size of 3 mm wide strips as shown in FIG. 16B. Further reduction in particle size can be achieved using recirculation of material. Any dust that may be generated in the process is collected using the attached dust collection with sound enclosure 2. Hopper Accurate material feeding may impact the control of the torrefaction process. The live bottom hopper as shown in FIG. 2 was developed and manufactured in-house for this purpose. The live bottom hopper has the following characteristics: (a) positive hopper angle, i.e., the width at the bottom is higher than the width at the top with a 3° incline, (b) independently controlled variable pitch screws. The positive hopper angle avoids any occurrence of bridging during the material flow. The variable pitch allows maintaining a uniform material level in the hopper. The weight of the bottom hopper is monitored continuously using four load cells placed under the legs. Each leg has a vibration insulating pads to insulate the motor vibration from the load reading.

Total of four bucket elevators are used for conveying the material from one piece of equipment to the other. Bucket elevators are known for their suitability and reliability in conveying bulk material. The bucket elevators used in the experimental system are U-series bucket elevators of various heights and capacities manufactured by Universal Industries, Inc

C. Heating and Compaction Unit

Continuous and stable feeding is critical for the operation of any fuel-producing facility. Mixed fiber-plastic wastes and MSW feedstock is known to have flowability problems such as bridging in hoppers due to a variety of reasons like heterogeneity, different size, density, moisture content, compressibility. A standard solution to this problem is to limit the type of material used or to use pneumatic or mechanical agitation techniques. However, neither provides an efficient solution. To deal with this issue we developed and manufactured in-house a vertical mechanical screw (heating and compaction unit) that can provide a constant mechanical agitation and direct the material downwards.

FIG. 5 and FIG. 6 show views of the airlock and a heating and compaction unit. The material continuously fed by gravity from the top to the airlock. The airlock used in the experimental system is a S8 series double-flap type airlock manufactured by Plattco® Corporation. One flap out of the two in the airlock is always in the closed position, which allows airlock to constantly maintain a positive seal. This is followed by material dropping in a sharp 70° angle chute with Teflon coating to prevent material buildup. The material is then received by a double helix auger that ensures proper and fast material feeding into the main chamber. As the material continues to flow, material is compacted with two-stage cross-section reductions from 0.30 m to 0.15 m and 0.15 m to 0.10 m respectively. This reduction generates a higher friction coefficient that compresses the material from ~50 kg/m$^3$ to 650-700 kg/m$^3$. The helix and pitch changes throughout the shaft from double helix with 0.15 m pitch at top to single helix with 0.20 m pitch.

The heating and compaction unit did not work with 100% woody biomass or paper/cardboard as the friction and compaction coefficient required major electrical expenses. Experiments show that at least 10-15% plastic enables smooth working.

The heating and compaction unit is equipped with six external electrical heating elements, maintained at 180-220° C., to help soften the plastics in the mix and form paste-like material, reducing friction with the heating and compaction unit's walls. The heating and compaction unit temperature was selected according to a differential scanning calorimetry (DSC) measurement that indicates phase transition (melting) of the major plastic components. The heating and compaction unit may have capability for a 100% fill rate which leads to a compact footprint, high rate of heat transfer, the ability to dry the material to yield a uniform paste and input material into the mouth of the reactor at a high mass feed rate.

1. Reactor

The fiber-plastic waste material is mixed, heated, torrefied, and extruded to produce rods before being cut into pellets. FIG. 7 shows the integrated torrefaction-extrusion reactor.

The reactor is made of a 4-inch diameter shell externally heated by a series of electrical heaters. The shaft, 1.5 inches in diameter, is made from 15-5PH stainless steel. The reactor is designed with 4 zones: (i) transition zone; (ii) heating-reaction-grinding zone; (iii) feed zone (pre-extrusion); and (iv) extrusion zone. Each zone is designed to address a unique problem. Zone (i) addresses the feeding-related issue, ensuring a smooth and fast transition from the inlet of the reactor to the next zone. Zone (ii) is designed to maximize residence time and increase the mixing of the materials. As residence time and temperature determine the rate and extent of torrefaction, this design has improved residence time by up to a factor of 3 compared to a regular screw reactor. Enhanced mixing has been proven to improve heat transfer from the walls and radial temperature uniformity. Zones (iii) and (iv) compact the material to a density suitable for storage and transportation while maintaining a low L/D ratio. At the end of the extruder, the material is guided to the die using a unique die design. The compressed material at the die also creates a plug, or an airlock, preventing oxygen penetration into the reaction area. While torrefaction occurs at 250-350° C., extrusion temperatures for improving pellet quality may be between 160-180° C., which requires efficient cooling (described following).

We note that in a regular torrefaction plant, each of the above-mentioned functions is carried in a separate reactor or component. The plastic in the blend is enabled to carry all these stages (heating-reaction-grinding and extrusion) in one reactor by one shaft as the plastic turns the blend into a paste after melting.

The extruder temperature was controlled by an oil heating/cooling system using mineral oil due to its high heat capacity and safety characteristics. The system used for temperature control was manufactured by Heat Exchange and Transfer Inc, PA, USA, using Therminol XP® oil. During the startup, the oil is heated using an inbuilt 15 kW heater, while during the operation, the oil is cooled using a 73-kW capacity oil to the water heat exchanger.

The total combined length of reactor and extruder is 3.3 m. The experimental system includes of a single shaft with different zones, defined by different function-specific flights mounted on it. In the reaction zone, the flights are modified with cuts to increase the residence time. The reaction zone has L of 2.67 m and D of 101.6 mm with a paddle (screw) pitch of 76.2 mm. The flights in the extruder section are modified to have a decreasing variable pitch to achieve the compaction for the formation of pellets. There are a total of 12 flights in the extruder section starting with 76.2 mm and gradually decreasing to 25.4 mm. The L/D ratio of the extruder section is 6, which is smaller as compared to typical modern extruders L/D ratios of 18 to 40. Shorter L/D allows for lower torque and power requirements. There are four access ports to the reactor, each with top and bottom access. Port 1 top (from left) is used as an inlet to the reactor and Port 3 top is used to send off-gasses to the condensers and gas cleanup system (not shown). The rest are used for maintenance access. The material is thermally treated in the reactor section and continues into the extrusion section which is 101.6 mm in D and 102.4 mm in total L. At the end of the extruder, the material is extruded in the form of long rods using a die with 8 holes of 12.7 mm D each. The extruded rods are cut into pellet form using the cuter attached to the die (not shown). Two shafts were used in this study, first with 20% cuts and 40% cuts. The latter was used only for residence time study as described in Section 2.3.3.

The reactor is heated using a series of electric band heaters. All the band heaters are operated at 480 V and have a capacity ranging from 2 kW to 5 kW. The heaters are configured in five sets as follows: (a) set 1, located between port 1 and 2, includes 10 heaters of total 30 kW in a sequence of 1×5 kW, 6×2 kW, 2×4 kW, and 1×5 kW; (b) set 2, located between port 2 and 3, includes 2 heaters of total 9 kW; (c) set 3, located between port 3 and 4, includes 1 heater of total 4 kW; (d) set 4, located after port 4, includes 1 heater of total 6.5 kW and (e) set 5 includes 3 heaters in the access port bottoms with 2.5 kW each. The distance of heaters H1 to H17 from the center of the inlet port is 0.19, 0.24, 0.29, 0.34, 0.39, 0.44, 0.5, 0.56, 0.60, 0.70, 0.83, 0.98, 1.21, 1.44, 1.59, 1.69, and 1.84 m respectively. The extruder temperature was precisely controlled using an air-cooled heat exchanger jacket. The oxygen-free environment is maintained by (a) using a mechanical airlock on the inlet side; (b) a material seal created by the extruder on the outlet side and (c) flowing nitrogen at ~4.7 lpm. All the condensable and non-condensable gases produced during the process are sent to a conditioning system including Dry Sorbent Injection, condensers, and demister filter attached to port 3 of the reactor-extruder system (not shown).

2. Cutter

Pellet cutting was used in the pelletization process. The ring die produces multiple rods (8 hole configuration) that must be cut to ensure consistent cooling and transition to downstream equipment. FIG. 12 shows the cutter, with multiple blades, that was developed for throughput up to 200 kg/h. The cutter is attached to the extruder with its blades that can be adjusted to slide over the outer surface of the ring die. The blades are manufactured from tool steel alloy and are thermally treated to hardness of HRC 55 for extra hardness and reduced blade dullness. To produce a uniform length of pellets the rotation speed of the cutter is coupled using a PLC code with the die pressure measurement, as for a given material and temperature, extrusion velocity is a function of die pressure.

3. Pellet Cooler

Pellets exit at a temperature in the range of 160-200° C. and must be cooled before storage and transportation. A commercial counterflow cooler of 500 kg/h capacity manufactured by Münch-Edelstahl GmbH is used as part of the experimental system. Pellets are conveyed from the cutter by a bucket elevator into an airlock on the top of the cooler, are dropped by gravity into the cooler, where air enters from the sides, counter flows and is dragged by a blower through a cyclone (to collect fines) then pass through a bag filter to block and particulates under 0.5 micron from being released to the environment.

D. Mass and Energy

To measure mass and energy going in and out of the experimental system, the following five parameters were measured: (i) moisture content before and after the process, (ii) weight measurement of feedstock (inlet) and the pellets produced (outlet) (iii) heat content of the pellets (iv) process heat used by the heating and compaction unit and reactor units (v) specific electrical energy for the live bottom hopper, heating and compaction unit, reactor, cutter, bucket elevators and the pellet cooler.

Moisture and Mass Balance: For mass balance, the moisture content was measured using HFT 1000 Moisture Analyzer by Data Support Inc. Minimum of five measurements were performed per batch to have accurate moisture measurement. This facilitates the measurement of the mass lost in the form of vaporization of water during the torrefaction. The moisture content was measured for the feedstock ($\dot{m}_{moisture\_in}$) and for the produced pellets ($\dot{m}_{moisture\_out}$) To measure the mass balance of solids, two different sets of load cells manufactured by Omega (Model: TWA5 series) were placed under: (i) bottom hopper and (b) pellet cooler. This allows the measure the net feed ($\dot{m}_{feed(net\_in)}$) entering the reactor using the equation, $$\dot{m}_{feed(net\_in)} = \dot{m}_{feed\_in} - \dot{m}_{moisture\_in} \quad \text{Equation 1}$$

where $\dot{m}_{feed(in)}$ is the feedstock entering the Heating and compaction unit at inlet including the moisture. The final weight of produced pellets is measure using.

$$\dot{m}_{feed(net\_out)} = \dot{m}_{feed\_out} - \dot{m}_{moisture\_out} \quad \text{Equation 2}$$

where, $\dot{m}_{feed\_out}$ is the feedstock in the storage unit after cooling.

The mass lost to the gas stream in the torrefaction was calculated as, $$\text{Mass Loss} = 1 - \frac{\dot{m}_{feed(net\_out)}}{\dot{m}_{feed(net\_in)}} \quad \text{Equation 3}$$

As shown, the heat content is the function of mass loss.

Heat content: was measured before and after torrefaction using a bomb calorimeter (Parr Instrument Company, Model 6100). A typical experiment involved a 1-2 g grounded mixed waste sample placed into a bomb-crucible. The bomb was then filled with oxygen (~400 psi) and was submerged into a jacket filled with 2000 g of distilled water. The sample was ignited, and the heat released was measured in the form of the temperature difference of the water in the jacket before and after the combustion. The relation between the heat and chlorine (a pollutant of interest for solid fuel users) content with respect to mass loss was studied and is summarized in the Results section. The mass loss and chlorine content of the same material torrefied in a batch reactor and the continuous pilot-scale reactor are compared. Instead of temperature and time, mass loss is used as a universal variable to present the heat and chlorine content results for torrefaction.

Process heat: to the heating and compaction unit and the reactor was measure by multiplying the percent duty cycle (defined as the time the heater is on over the cycle time) of the electric heaters and the wattage of the heaters. This allowed the measurement of the process heat utilized by the heating and compaction unit and the reactor at specific feed rates and temperatures.

Specific electrical energy: can be defined using Equation 4, $$\text{Specific Electrical Energy } (e) = \frac{\text{Energy consumed}}{\text{Mass flow rate } (\dot{m})} \quad \text{Equation 1}$$

where e is the specific electrical energy required to drive each of the motors in the experimental system (for the shredder, live bottom hopper, bucket elevators, heating and compaction unit unit, reactor unit, and the cutter) and $\dot{m}$ is the mass flow rate through the equipment.

The live bottom hopper, the reactor, and the heating and compaction unit are controlled using a variable frequency drive (VFD), which provides the required electrical information, and Ė was measured as a function of mass flow rate. The bucket elevators and the pellet cooler were not operated by VFDs, and a current transmitter was connected to their power supply for measuring their e. All the data was processed using a commercially available Series-P3 PLC (by Automation Direct) unit. The Indusoft V8.1 HMI software was used as the data acquisition system.

For the shredder, e was measured using three different materials: (a) plastic films ($\rho=35.16$ kg/m³), (b) mix fiber-plastic films ($\rho=76.17$ kg/m³), and (c) mix fiber-plastic fines ($\rho=263.34$ kg/m³) to understand the effect of density and different shredded materials. The current was measured at every 0.25 s. The mass flow rate was increased from 0 kg/h to flood feed (max) for each material in increments of 30 kg/h.

For the live bottom hopper, e was measured using mix fiber-plastic films (p=76.17 kg/m³). The bottom hopper has been tested with several different materials during past experiments; the aim here is to demonstrate the consistent flow of material using the rotation frequency (rpm) vs. mass flow rate plot. To measure the specific energy consumption current was measured at a frequency of 4 Hz. The mass flow rate was increased by increasing the frequency by 15 Hz intervals. All the experiments were triplicated.

Energy required to drive the heating and compaction unit and the reactor unit was measured along with the electricity consumption of all the equipment in the experimental system. The specific electrical energy for the bottom hopper, reactor, and heating and compaction unit was measured for the blend as a function of feedrate. The electrical energy consumption for bucket elevators, cutter, pellet cooler which operated at constant frequency irrespective of feedrate was also measured. Most of the motors are controlled by a Variable Frequency Drive (VFD) to provides the specific electrical energy information. For the rest, a current transmitter was attached to units. All the data was collected using commercially available Series-P3 PLC (by Automation Direct). Indusoft V8.1 was used as the data acquisition system.

E. Results and Discussion

1. Moisture and Mass Balance

Figure 18:
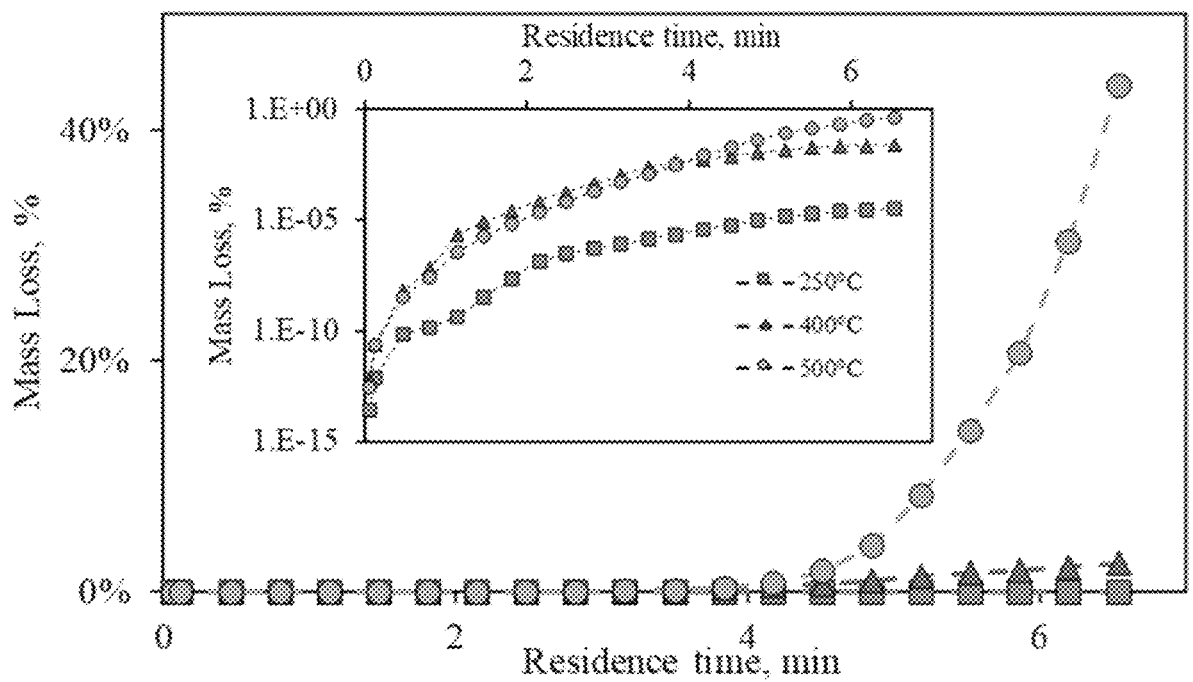
FIG. 18 depicts the mass loss of the material as a function of residence time at three different temperatures (250° C., 400° C., and 500° C.).

The mass balance is performed on the experimental system by measurement of moisture and the weight of incoming and outgoing solid materials as described above. The average moisture content was 4.5%. FIG. 18 depicts the mass loss of the material as a function of residence time at three different temperatures (250° C., 400° C., and 500° C.). The data for the mass loss allowed to relate the mass lost with the heat content of the produced pellets using the experimental relationship generated for this specific blend.

2. Heat Content

Figure 19:
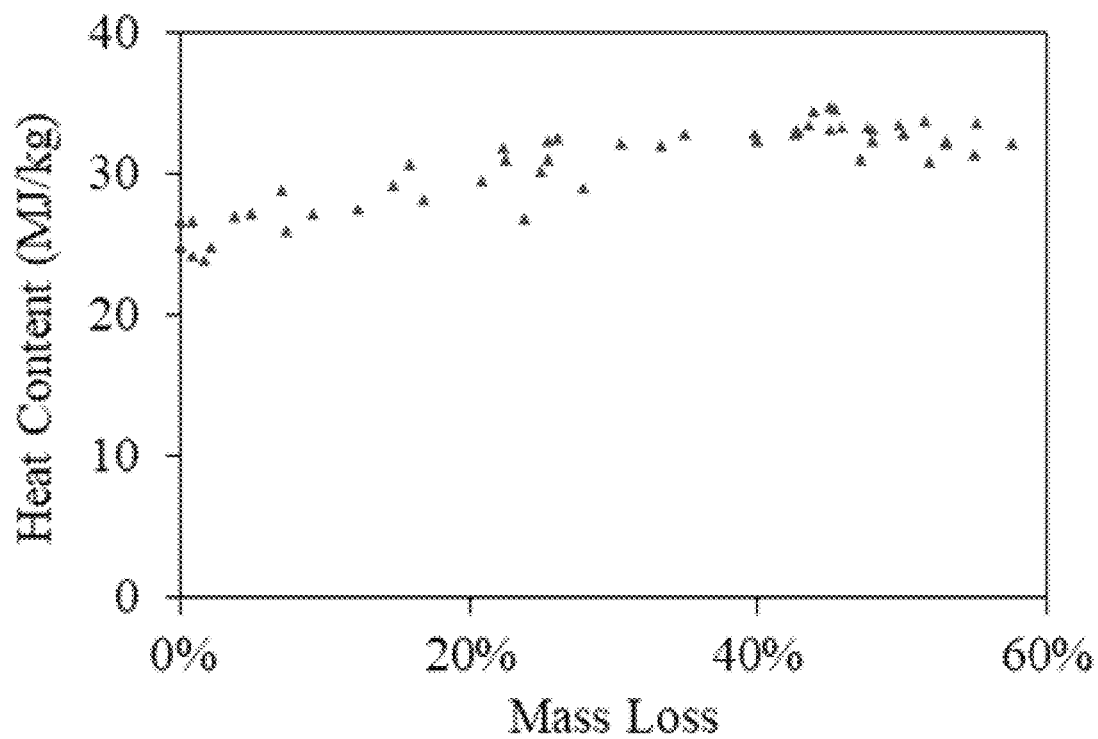
FIG. 19 shows the relationship between heat content and mass loss for the 60:40 fiber-plastic blend.

As the material thermally degrades the heat content increases. FIG. 19 shows the relationship between heat content and mass loss for the 60:40 fiber-plastic blend. The mass loss represents the mass lost in form of condensable and non-condensable gases during the torrefaction process. Note that the mass lost is on a moisture-free basis. The torrefaction experiments for the data shown in the FIG. 19 was measured using a stationary muffle furnace reactor. However, it is noted that mass loss can be assumed to be universal parameter, and which can be achieved with various combination mix of temperature, time and type of the reactor. Thus, although conditions for reaching the specific mass loss will differ the integrated torrefaction-extrusion reactor, it is expected to have similar heat content vs mass loss relationship. The heat content of the material is ~25 MJ/kg at 0% mass loss and continues to increase to a peak of ~33 MJ/kg at 45% mass loss due to loss of volatile matter.

3. Process Heat

Table 1 shows the process heat used by various processes in the experimental system. Table 1 shows that the heating and compaction unit requires 50 kWh/tonne to heat the material to 180° C. This assumes the material densification factor of 17 inside the heating and compaction unit. The reactor requires about 100 kWh/tonne for heating the material to ~350° C. and feedrate >50 kg/h.

TABLE 1

Process heat used by equipment type.

| Equipment | kWh/dry tonne |
|---|---|
| Heating and compaction unit | 50 (for 180° C.) |
| Reactor | 100 (for 350° C.) |

4. Specific Electrical Energy

Table 2 presents the specific electrical energy used by various processes in the experimental system. For the reactor, the specific electrical energy goes does as a function of mass loss using the relationship of specific electrical energy $(p)=$ Mass flow rate $(\dot{m})^{-0.684}$, where specific electrical energy is in kWh/dry tonne and m is in kg/h. Note that this relationship measured to feedrate up to 50 kg/h. The energy requirements are expected to reach an asymptotic value as the federate continues to increase. As seen in the table, shredder and heating and compaction unit-torrefier unit are the largest energy consumers in the experimental system accounting for 47.7% consumption each.

TABLE 2

Energy consumption by equipment type

| Equipment | kWh/dry ton |
|---|---|
| Infeed Belt | 0.35 |
| Shredder | 30.0 |
| Live Bottom Hopper | 0.35 |
| Bucket Elevators | 0.35 |
| Heating and compaction unit and Torrefier | 30.0 |
| Cutter | 0.35 |
| Pellet Collector | 0.50 |
| Cooler | 0.70 |
| Conveyor to Storage | 0.35 |

5. Shredding

Figure 20A:
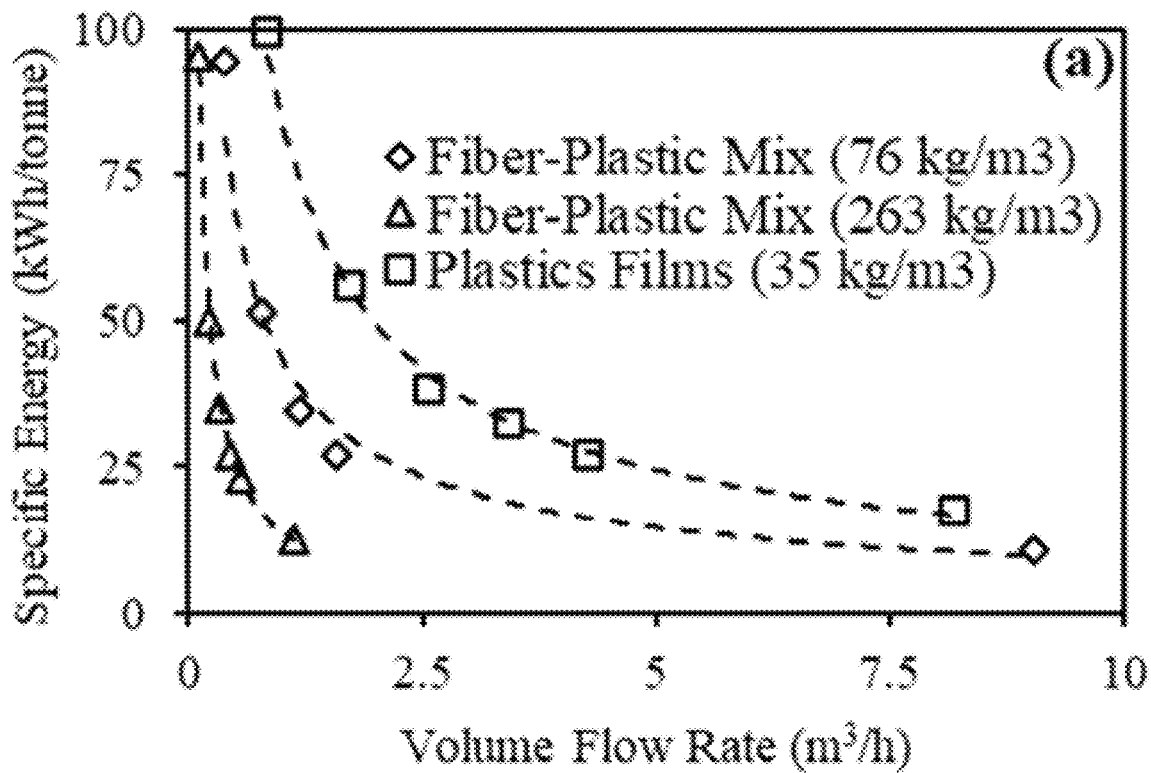
FIG. 20A shows the specific energy consumed by the shredder vs. the volume flow rate.
Figure 20B:
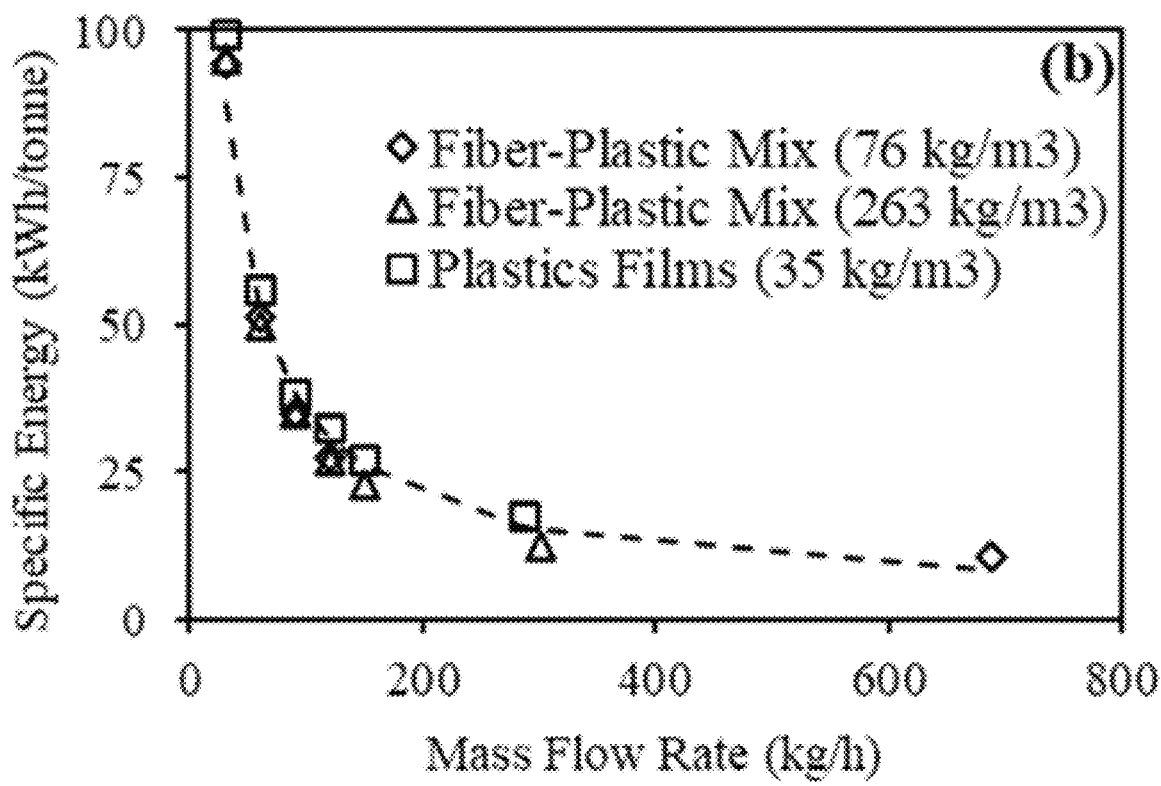
FIG. 20B shows the specific energy consumed by the shredder vs. the mass flow rate.

The energy to operate the shredder, which operates at low shear, was measured for various materials at various densities. Three different materials: plastic films ($\rho=35.16$ kg/m$^3$), mix fiber-plastic material ($\rho=76.17$ kg/m$^3$), and mix fiber-plastic ($\rho=263.34$ kg/m$^3$) were tested. Most plastic and fiber wastes in all the different materials are films with thickness typically ranging between 0.05-2 mm. The specific electrical energy consumed as a function of mass flow rate allows us to calculate the shredding cost for the shredder's operation. FIG. 20A shows the specific energy consumed by the shredder vs. the volume flow rate, with the observation that the lower the density, the higher the electric specific energy consumption. FIG. 20A also implies that the lower the density, the larger shredder needed for a given mass feed rate. FIG. 20B shows the specific energy consumed by the shredder vs. the mass flow rate, with the observation that the specific energy consumed by the shredder is not dependent on density; the specific energy consumption was similar across all the materials: the specific energy is reduced from 100 kWh/tonne to 10 kWh/tonne.

6. Live Bottom Hopper

For the live bottom hopper, the key aim is to provide consistent dosing of the material. The rheological nature of the feedstock has a strong influence on the consistent operation of the live bottom hopper and its efficiency for accurate dosing. Assessing all these materials and the rheological properties of our wastes is difficult; however, we realized through numerous experimentations that the type of shredder and shape of the shredded material has the strongest influence on the flowability of the material. As indicated above, low shear shredders appear to generate flakes that flow better than high shear shredders. Further, stripe-shaped flakes were found to cause bridging, whereas square-shaped flakes prevent bridging. The angle of the walls of the feeder is also critical. Our feeder was designed and constructed following these experiments and findings. The mass flow rate of a specific material vs. the rotation frequency was found to be an excellent indicator of the suitability of the feeder and the bridging propensity. Screw augers operating at flood-fed conditions are outstanding feeders providing very accurate mass flow rate, provided no bridging occurs.

Figure 21A:
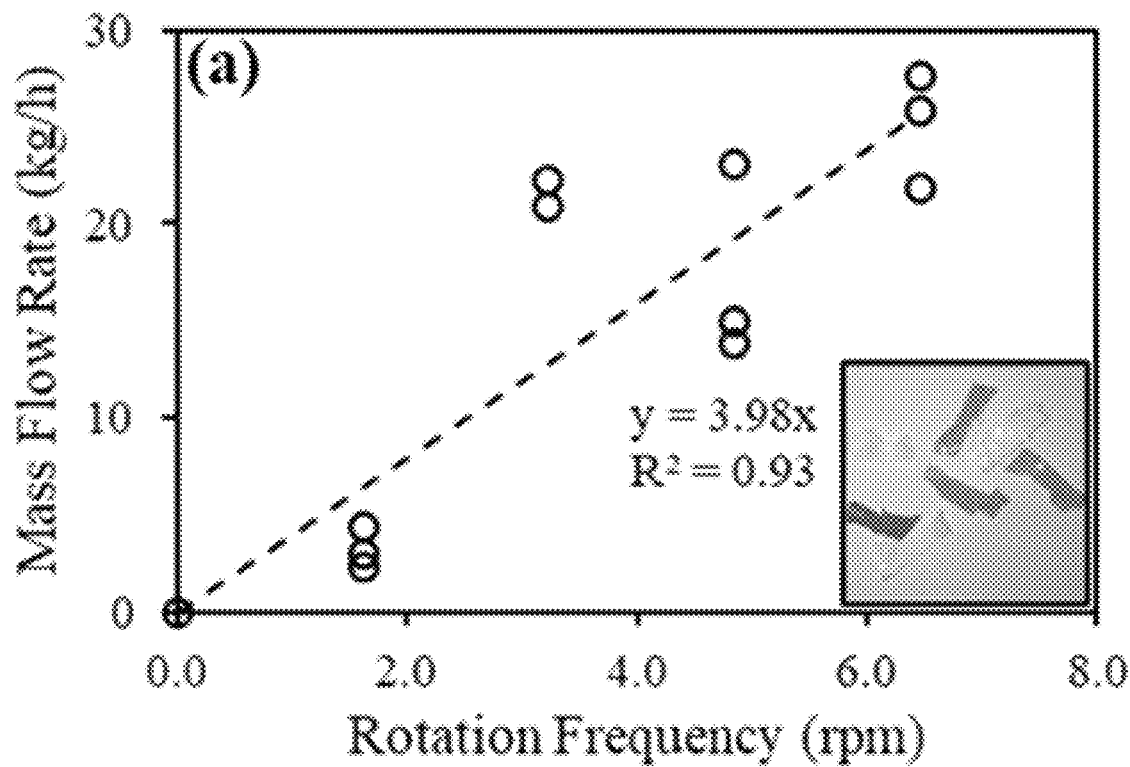
FIG. 21A shows the mass flow rate of striped shaped flakes (3-mm wide and 12-mm long) produced from an experimental shredder when the material was shredded in a single pass.
Figure 21B:
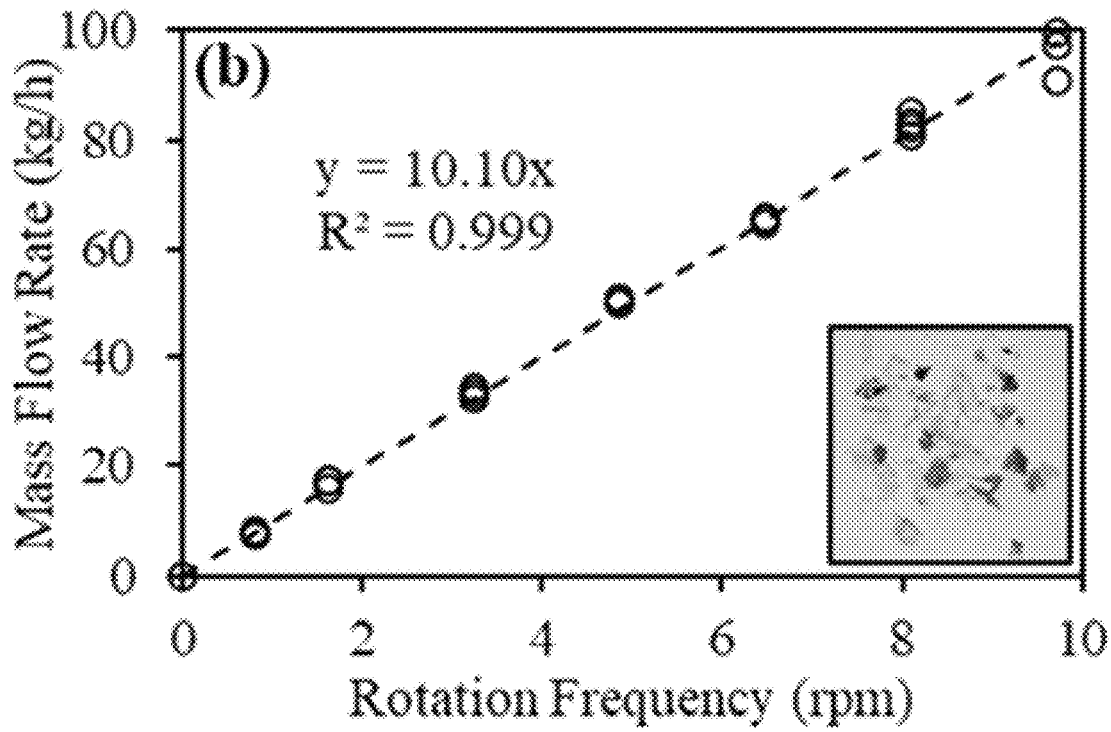
FIG. 21B shows the mass flow rate of striped shaped flakes produced from the experimental shredder when the material was shredded in two passes.

FIG. 21A shows the mass flow rate of striped shaped flakes (3-mm wide and 12-mm long) produced from the experimental shredder when the material was shredded in a single pass. As shown, the mass flow rate is irregular and cannot be used for conveying and dosing. When the striped material was passed a second time through the shredder, square flakes were produced (3-mm by 3-mm as shown in the inset) were produced; the mass flow rate of this material is depicted in FIG. 21B, showing a linear increase with the rotation frequency, with clear consistent material flow.

Figure 22:
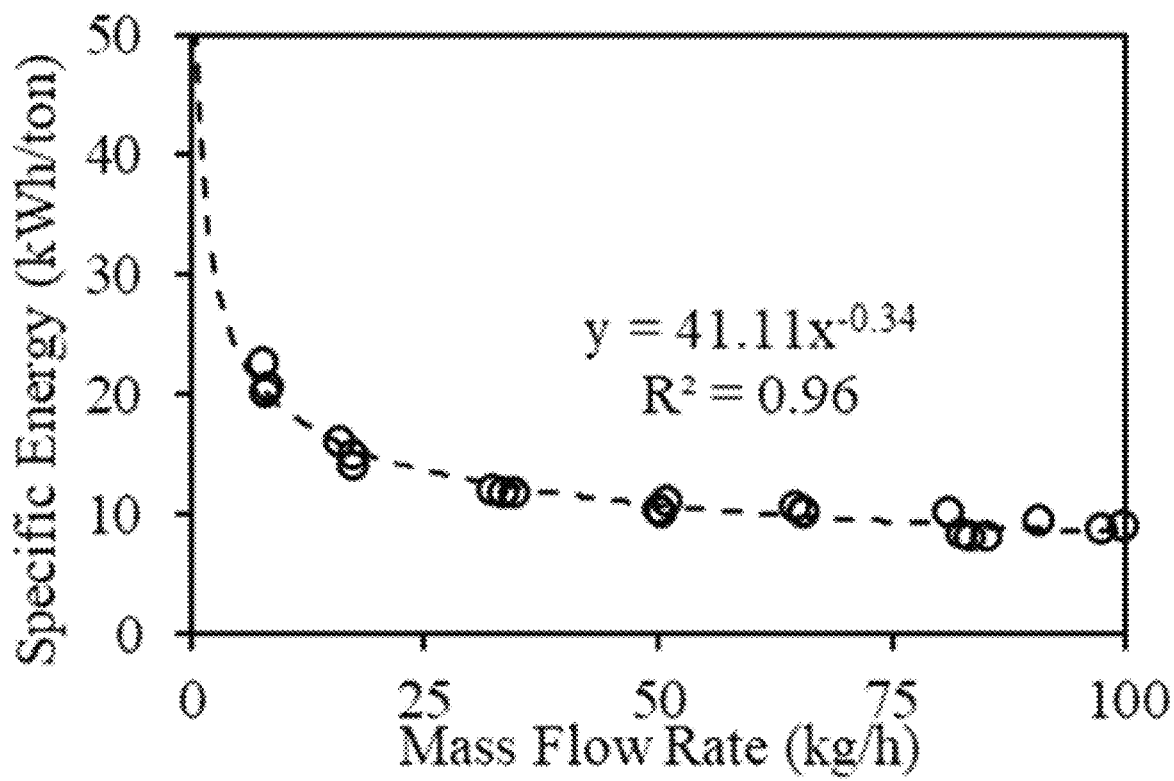
FIG. 22 shows the specific energy consumption of the live bottom hopper as a function of mass flow rate.

FIG. 22 shows the specific energy consumption of the live bottom hopper decreasing with the increase in the mass flow rate. For mixed fiber-plastic material with a density of 149 kg/m³ that was shredded to the size of 3-mm by 3-mm, Equation 5 can calculate the specific energy:

$$e = 41.11 \times \dot{m}^{-0.34} \qquad \text{Equation 2}$$

where, e is the specific energy consumed by the live bottom hopper, and m is the mass flow rate of material from the live bottom hopper. The behavior of the specific energy for the live bottom hopper decreases with mass flow rate; for example, for a 1 tonne/hr mass flow rate the specific energy is 3.9 kWh/tonne.

7. Heating and Compaction Unit

For the heating and compaction unit, estimated electrical consumption (based on experimental runs) for a material compression factor of ~17 is at 40 kWh/tonne, and the heating requirement is 50 kWh/tonne. However, it is noted that the heating and compaction unit load, and as a result, the specific electrical energy consumption is very sensitive to the rotation frequency of the heating and compaction unit and the temperature setpoint. e vs. rotation frequency and e vs. temperature has a strong non-linear correlation. During the experimentation, a sudden drop of load and energy consumption of ~50% is observed after the heating and compaction unit frequency exceeds 10 rpm for 60:40 fiber plastic blend materials at 200° C. This can be attributed to the factors like change in viscosity and several rheological factors. Thus, we believe, the complex nature of the heating and compaction unit behavior deserves a separate study to quantify the energy consumption relationship. However, to understand that average energy consumption at normal operating conditions is at the average value of 40 kWh/tonne reported above can be used.

Figure 23:
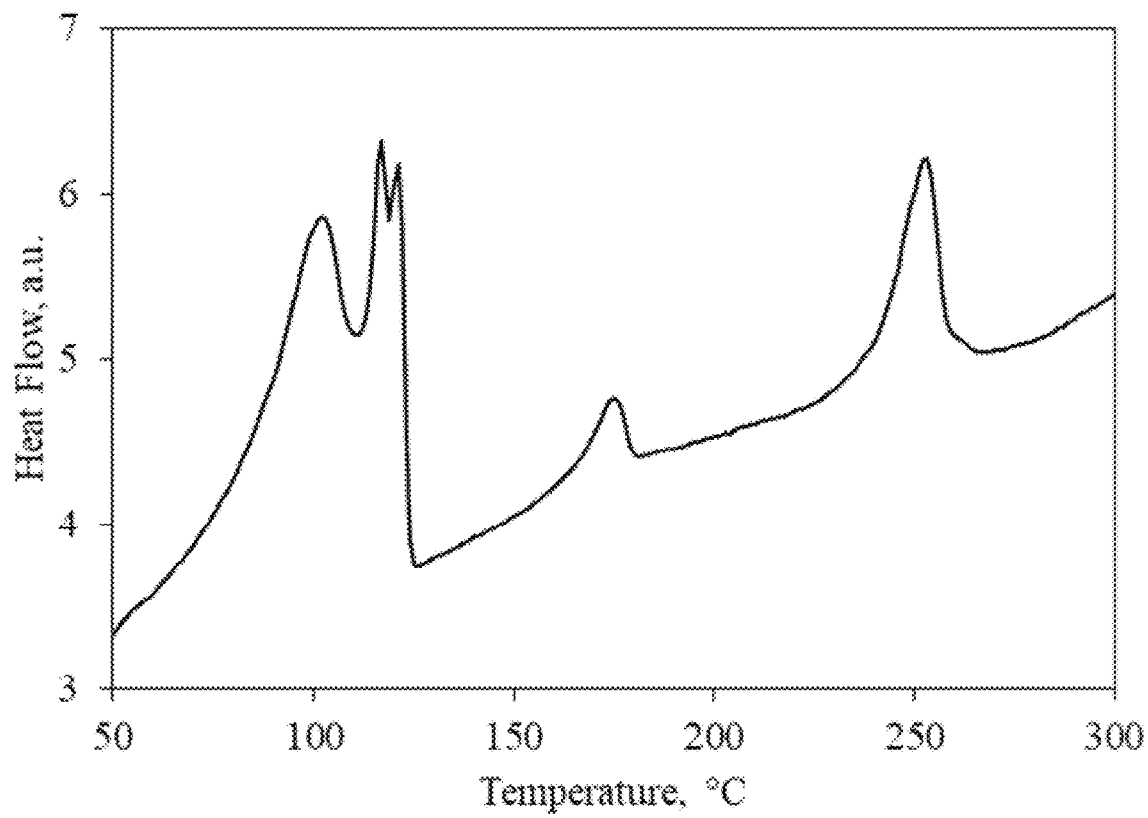
FIG. 23 shows heat flow versus temperature for an experimental heating and compaction unit.

FIG. 23 shows heat flow versus temperature for the experimental heating and compaction unit. The heating and compaction unit temperature was selected from the DSC trace measured for the material used and shown in FIG. 23. The peaks represent an endothermic process attributed to phase transitions. The first peaks at around 100-125° C. are attributed to polyethylene (PE) melting; the peak around 170° C. is attributed to melting of polypropylene (PP); these two plastics constitute the majority of the plastic waste. The peal around 250° C. is attributed to polyethylene terephthalate (PET) melting. We selected to operate the heating and compaction unit at 180-190° C. as both PE and PP melted, and PET can be dissolved into them, thus creating a flowing paste.

8. Reactor

For the reactor, the specific mechanical energy of 335 kWh/tonne was used to convey and extrude the material at an average mass flow rate of 9 kg/h; the specific mechanical energy drops to 94 kWh/tonne at 50 kg/h, further drops to 12 kWh/tonne at 1 tonne/hr. The correlation between the specific energy required and mass flow rate is presented in Equation 6.

$$e = 1370 \times \dot{m}^{-0.684} \qquad \text{Equation 3}$$

An additional 125 kWh/tonne of thermal energy was used to heat the material to 350° C.

F. Mass Balance

Figure 24:
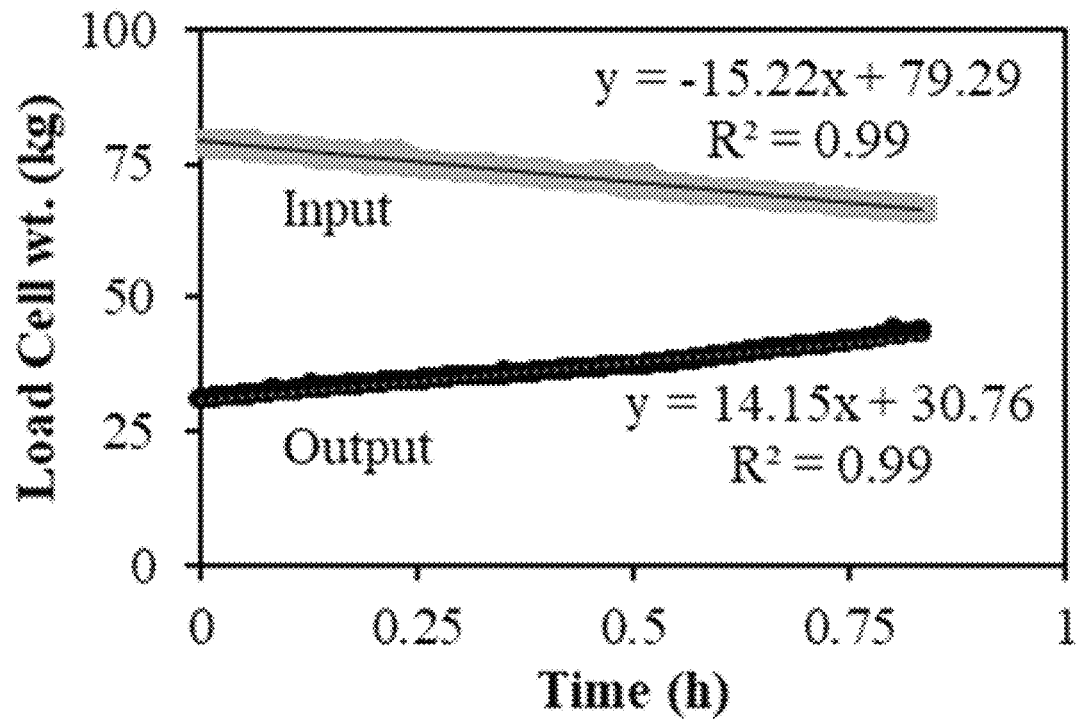
FIG. 24 shows the mass flow rate to an experimental system measured by the load cells from the live bottom hopper and the output flow rate shown by the load cells under the pellet cooler.

As described earlier, the mass balance is a tool to calculate mass lost in the torrefaction process. FIG. 24 shows the mass flow rate to the experimental system measured by the load cells from the live bottom hopper and the output flow rate shown by the load cells under the pellet cooler. FIG. 24 shows that the slope of the plot of respective measurements represents the mass flow rate in and out of the experimental system. The difference in their slopes denotes the mass lost during the torrefaction at the set conditions.

G. Heat and Chlorine Contents

Figure 25:
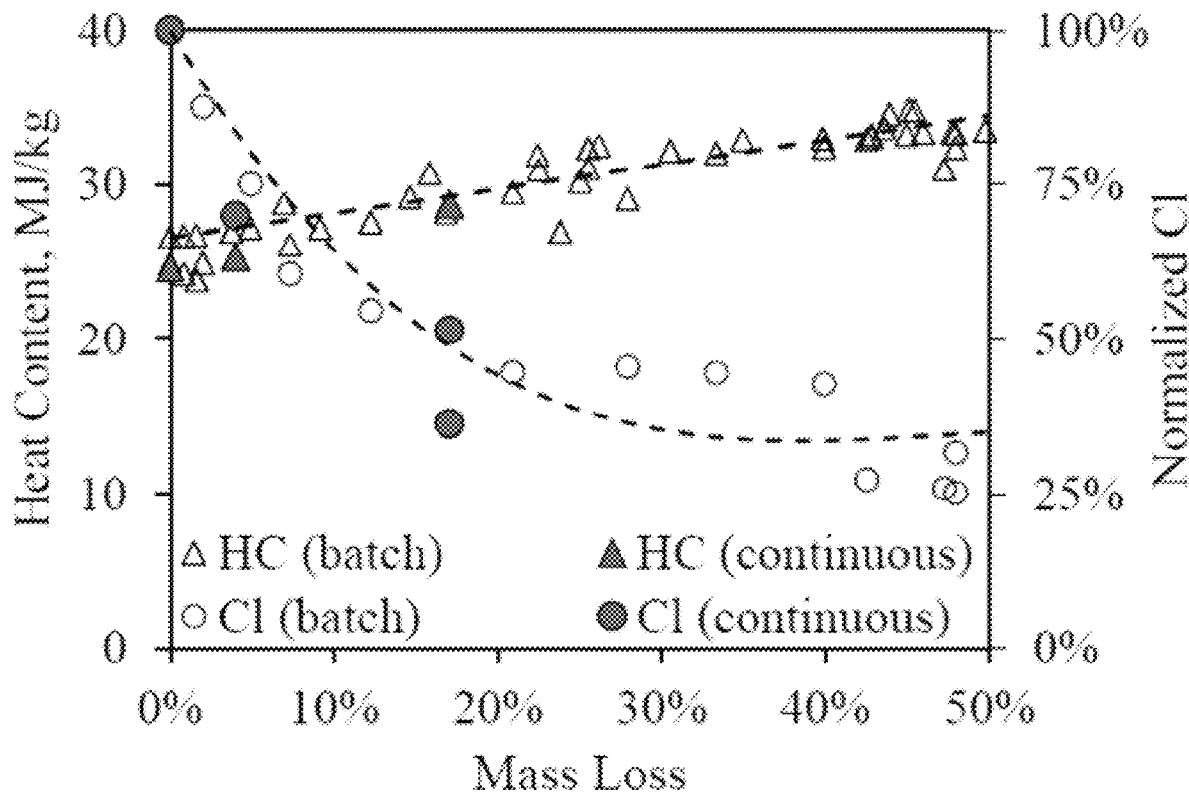
FIG. 25 shows the heat and chlorine contents of the 60% fiber and 40% plastic material from a lab-scale batch setup and pilot-scale continuous setup.

FIG. 25 shows the heat and chlorine contents of the 60% fiber and 40% plastic material from a lab-scale batch setup and pilot-scale continuous setup. It can be observed that instead of the specific temperature and residence time combination, mass loss can be used as a universal variable to quantify the heat and chlorine content of the material. It can be observed that with the increase in the mass loss from 0% to 50%, the heat content increases from ~25 MJ/kg to ~34 MJ/kg while the Cl content decreases by up to ~70%. The ppm levels vary batch to batch; however, the Cl removal is independent of the initial ppm levels of Cl. Also, the Cl removal is a function of mass, and the type of reactor (batch vs. continuous) does not play a major role. Using this relationship expressed in FIG. 25, mass loss can be used as an indicator to derive the properties of the produced pellets and vice-versa. In other words, the mass balance is a simple method of mass loss measurement that can be used for online calculation of the properties of the produced pellets.

H. Thermal Dynamics and Residence Time

To understand the stability of the experimental system, thermal dynamics were measured for several hours. The PID parameters of the heaters minimized the overshoot of the temperatures. The heating was started at the setpoint temperature of 300° C. with a typical ramp-up time between 4 to 8 h. After the set temperature was reached, the experimental system was maintained at a steady-state for a minimum of 2 h to ensure all the components have reached the set point. All the temperatures were within ±1° C. of the setpoint temperatures. The data for heat losses used in other heat transfer calculations were collected at this point. The material feed into the reactor and the dynamic response of the experimental system was recorded.

In the reactor, the relevant residence time is from the inlet to the point where the material flows into the extruder. As the screw had cuts, it was not possible to theoretically calculate the residence time using the standard formulae for the screw. A new method based on observation of the reactor motor power behavior was developed for the measurement. When the material reaches the extruder zone, there is an increase in the power of the motor rotating the shaft which is indicative of the material entering the extruder. Since the reaction zone is free of any compaction units, the motor load can only increase once the material reaches the extrusion zone. The experiment was carried out as follows: (a) the feed auger motor was turned off; (b) the reactor motor was rotating continuously at a given setpoint; (c) the feed auger was turned on at a given frequency, then turned off at a predetermined time interval; (d) the reactor was emptied by monitoring the reactor motor load (return to load values recorded in step b). After a given experiment, the rotation frequency of the reactor motor was changed, and steps (a-d) were repeated. Details regarding the interpretation of plots is provided below. As there are cuts in the screw that delayed the material movement, it is expected that more cuts would result in a longer residence time. The experiment was repeated for screw with 20% cuts and 40% cuts. The percent cut is calculated by the formula in Equation 7

$$\text{Cut}(\%) = 1 - \frac{\text{Area of paddle}}{\text{Area of full screw}} \qquad \text{Equation 7}$$

Figure 26:
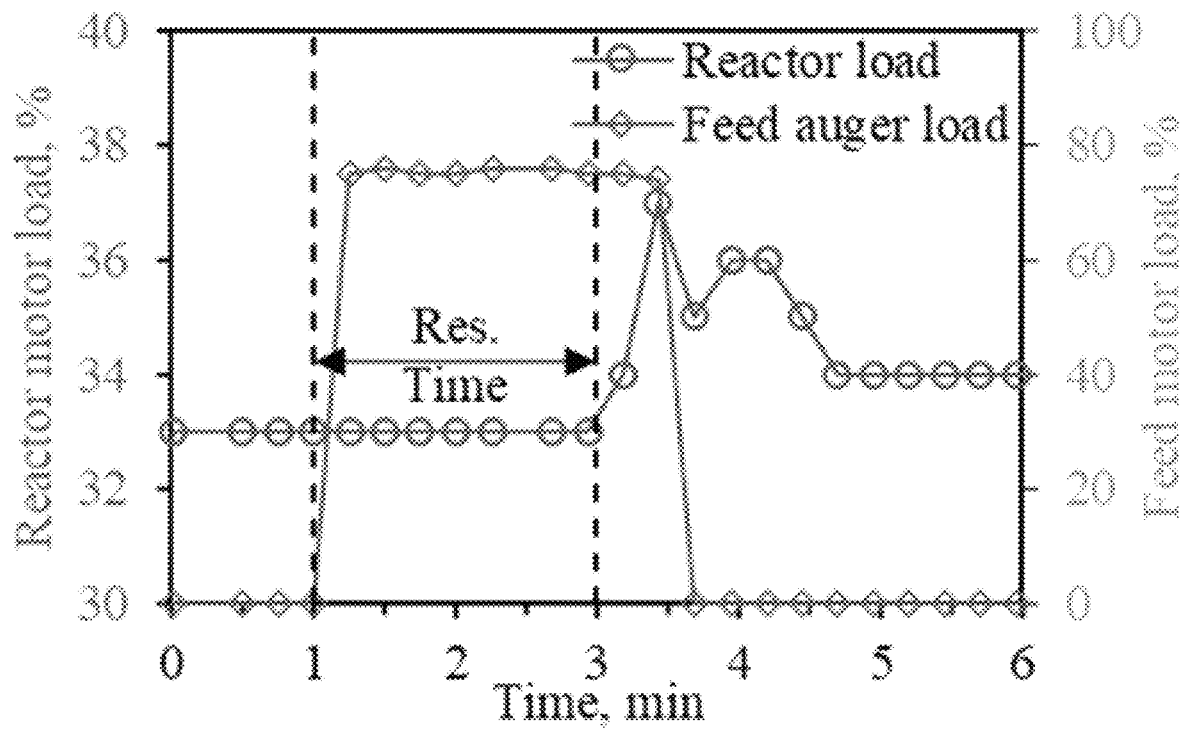
FIG. 26 shows residence time measurements for an experimental reactor.

FIG. 26 shows residence time measurements for the experimental reactor. In the reactor configuration shown in FIG. 7, the residence time is denoted as the time required for the material to travel from the inlet of the reactor to the start of the extruder. As it is difficult to predict the exact residence time using the conventional method of timing the material feed from inlet to outlet due to the integration of screw and extruder as well as cuts on the screw, and variability in material densities, the method described in above was used. As seen for the measurement in FIG. 26, initially the feed auger is off as seen from the 0% feed motor load and the reactor is operating at a normal load of ~33% motor load. At 1 min, the feed motor is turned on, represented by the rise in the feed motor curve (orange), meanwhile, the reactor motor load continues to be maintained at 33% showing the resistance-free travel of material in the reactor zone. At 3 min, the reactor load curve (blue) rises signaling that material has reached the extruder. As defined earlier, this time from 1 to 3 min is thus defined as the residence time. After some time, the feed auger was stopped as represented by the drop in the feed motor load curve and resulting fall of the reactor motor load. This process is repeated several times by changing the reactor shaft speeds.

I. Temperature Profile

To model the temperature profile of the material, net heat supplied heat capacity and moisture content is needed. Net heat supplied is defined as the difference between heat supplied with the material flow and heat losses to the surrounding. The heat losses were calculated as follows: (a) system was heated until the steady-state temperature was reached with temperature within ±0.5° C.; (b) after reaching the steady-state condition the heater duty cycle (DC), defined as the 'on' time of the heater ranging from 0 to 100%, was recorded; (c) heat lost to the surrounding was calculated by multiplying the duty cycle and the capacity of the heat (kW). The material was then flown into the experimental system. After achieving DC steady-state condition, the heat supplied to the material was calculated by measuring the DC and multiplying the DC with the heater capacity (kW) similar to the calculation of the heat losses. Based on the moisture content, the sensible and latent heat absorbed by the water was subtracted to convert the net heat supplied to a moisture-free (MF) basis. The material temperature was then calculated using Equation 8.

$$T_{material} = T_{setpoint} - \frac{\dot{m}c}{q} \qquad \text{Equation 8}$$

where, $\dot{m}$ is the material flow rate (kg/s), c is the heat capacity of the material (kJ/kg° C.) and q (W) is the net heat supplied on a moisture-free basis.

Figure 27:
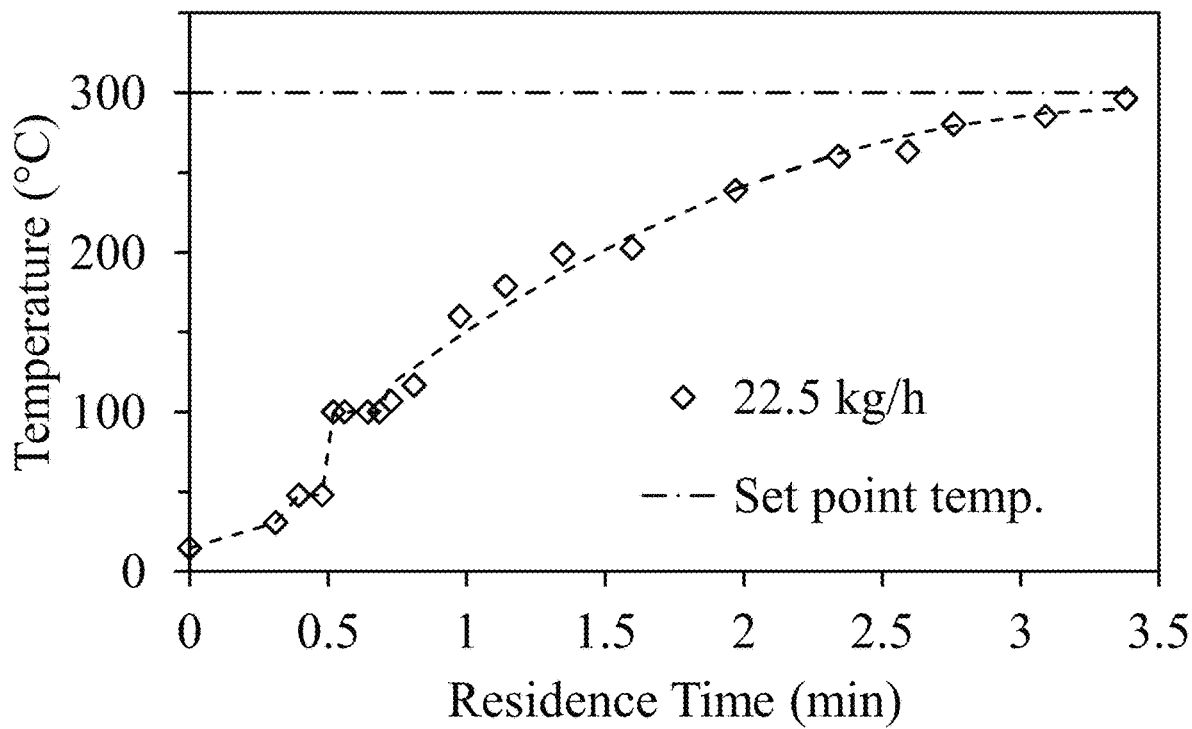
FIG. 27 shows a temperature profile plot for an experimental reactor.

FIG. 27 shows a temperature profile plot for the experimental reactor. More specifically, FIG. 27 shows material temperature (see Equation 8) versus residence time. Equation 8 was drawn from thermodynamic considerations. The parameters $\dot{m}$, c and q were experimentally measured. The parameter $T_{setpoint}$ is an input to the system and equal to the wall temperature at steady state. FIG. 27 shows a gradual increase of the material temperature as a function of time. This is an example of the material temperature profile for a given set of operation parameters. The temperature profile could be changed. For a given temperature profile, the mass loss and chlorine removal could be calculated and experimentally validated.

J. Overall Heat Transfer Coefficient and Specific Mechanical Energy

Overall Heat Transfer Coefficient (U) for combined modes of heat transfer is measured in this study. The general definition of heat transfer coefficient is given by Equation 9.

$$U = \frac{q''}{\Delta T} \qquad \text{Equation 9}$$

where q" is heat flux (W/m²), U is average overall heat transfer coefficient (W/m²K) and $\Delta T$ (° C.) is the difference in temperature between the reactor surface and the material. Overall Heat Transfer Coefficient was measured by plotting the heat flux, q" against the temperature difference. The slope of the plot indicates the value of U.

Figure 28:
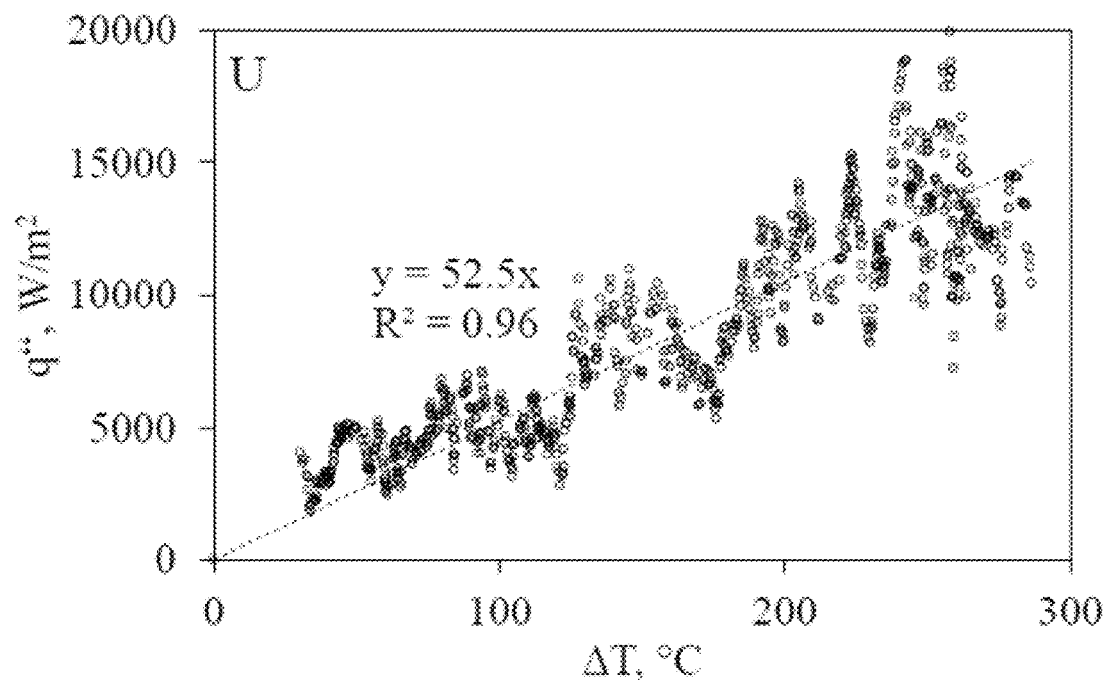
FIG. 28 shows an overall transfer coefficient plot for an experimental reactor.

FIG. 28 shows an overall transfer coefficient plot for the experimental reactor. More specifically, FIG. 28 shows heat flux versus temperature difference. Equation 9 was drawn from thermodynamic considerations. The parameter q" was experimentally measured. The parameter $\Delta T$ is calculated from Equation 8. FIG. 28 shows linear increase q" with $\Delta T$ from which the value of U is calculated from the slope. Knowing the value of U, a desired temperature profile may be achieved.

Specific Mechanical Energy is defined as energy divided by output rate as explained in Equation 10.

$$SME = \frac{P}{\dot{m}} \qquad \text{Equation 10}$$

where SME is the Specific Mechanical Energy (kWh/t); P=Drive Motor Power (kW); $\dot{m}$ is the throughput (kg/t).

K. Cutter Operation

Figure 29:
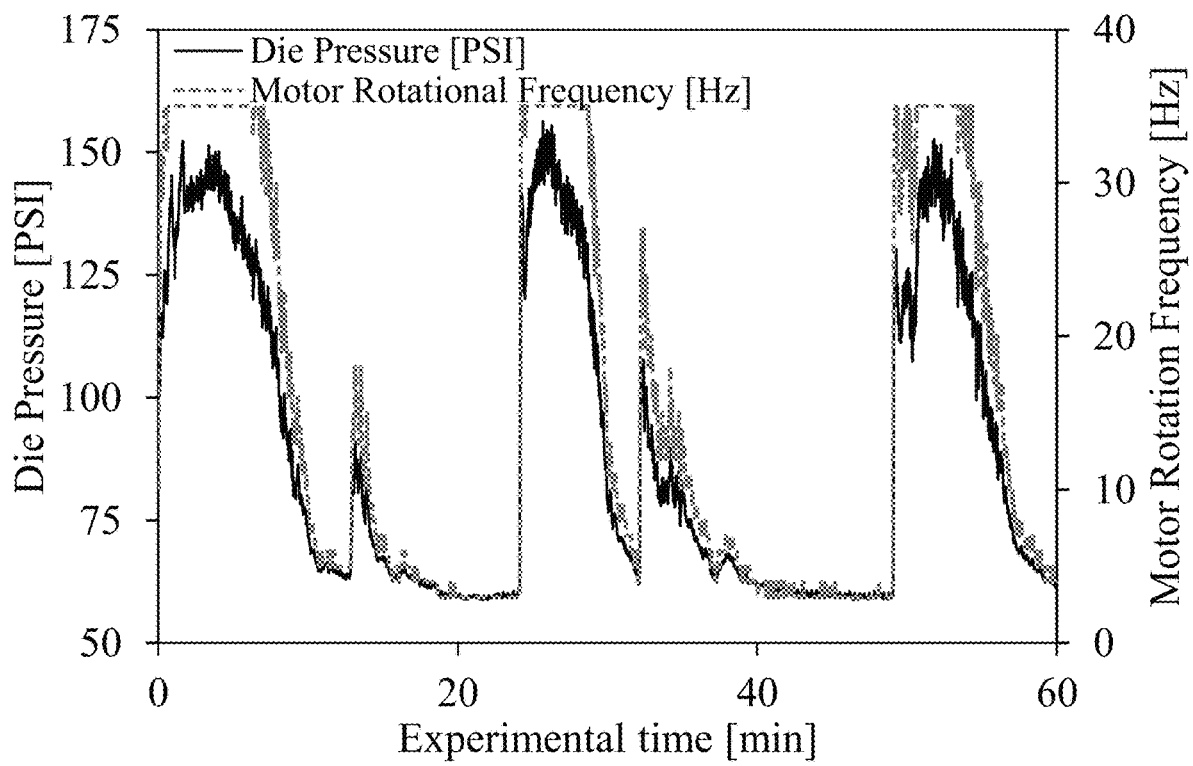
FIG. 29 shows a plot of die pressure and motor rotational frequency versus experimental time for an experimental cutting unit.

FIG. 29 shows a plot of die pressure and motor rotational frequency versus experimental time for the experimental cutting unit. The die pressure measurements were obtained using a pressure sensor positioned to measure material pressure as material flows through the die. It is observed that the die pressure follows closely the motor rotation frequency; or the motor rotation frequency depends linearly on the die pressure.

The invention claimed is:

1. A method for operating a system for torrefaction of waste material comprising biogenic and plastic material, the method comprising:
processing the waste material to generate a coarse size waste material, the coarse size waste material having a size no greater than 310 mm;
processing the coarse size waste material to generate a fine size waste material, the fine size waste material having a size no greater than 60 mm;
processing the fine size waste material to generate pre-processed waste material, comprising: operating a shredding unit at a speed less than 500 rpm
the pre-processed waste material having an aspect ratio between 0.8:1 and 1.2:1 and a largest dimension of less than 4 millimeters (mm);
wherein a density of the pre-processed waste material is between 105 kg/m$^3$ and 120 kg/m$^3$;
receiving the pre-processed waste material in an airlock;
providing the pre-processed waste material from the airlock to a heating and compaction unit;
compressing and heating the pre-processed waste material in the heating and compaction unit, including heating the heating and compaction unit to a temperature between 180° C. and 220° C.;
providing the compacted waste material to a reactor system such that a residence time in the reactor system is between 2 minutes and 30 minutes;
heating the compacted waste material in the reactor system to a temperature of 280° C.-500° C.;
extruding material from the reactor system; and
cutting the extruded material into pellets.

2. The method according to claim 1, further comprising cooling the pellets in a cooling unit,
wherein processing waste material further comprises removing metal material from the waste material.

3. The method according to claim 1, further comprising:
providing the pre-processed waste material to a hopper; and
conveying, with the hopper, the pre-processed waste material using a one or more parallel, independently driven variable pitch augers.

4. The method according to claim 1, further comprising capturing an off-gas stream from the reactor system, the off-gas stream comprising at least one chlorine (Cl) species.

5. The method according to claim 1, wherein cutting the extruded material comprises:
determining a pressure of material being extruded through a die;
correlating the pressure to a rotational frequency of a cutting unit cutting the extruded material;
communicating the rotational frequency to a variable frequency drive;
communicating a power signal to a motor; and
rotating a plurality of blades of a cutting unit with the motor.

* * * * *